(12) United States Patent
Liu et al.

(10) Patent No.: US 11,941,423 B2
(45) Date of Patent: Mar. 26, 2024

(54) DATA PROCESSING METHOD AND RELATED DEVICE

(71) Applicant: Huawei Technologies Co., Ltd., Shenzhen (CN)

(72) Inventors: Jinsong Liu, Beijing (CN); Rui Wang, Hangzhou (CN); Peijun Yin, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 619 days.

(21) Appl. No.: 17/132,435

(22) Filed: Dec. 23, 2020

(65) Prior Publication Data

US 2021/0149706 A1 May 20, 2021

Related U.S. Application Data

(63) Continuation of application No. PCT/CN2019/092827, filed on Jun. 25, 2019.

(30) Foreign Application Priority Data

Jun. 25, 2018 (CN) .......................... 201810659693.3
Aug. 13, 2018 (CN) .......................... 201810919527.2

(51) Int. Cl.
*G06F 9/455* (2018.01)

(52) U.S. Cl.
CPC .. *G06F 9/45558* (2013.01); *G06F 2009/4557* (2013.01)

(58) Field of Classification Search
CPC ......... G06F 9/45558; G06F 2009/4557; G06F 2009/45595
See application file for complete search history.

(56) References Cited

U.S. PATENT DOCUMENTS

| 2007/0180436 A1 | 8/2007 | Travostino et al. |
| 2012/0210203 A1 | 8/2012 | Kandekar et al. |
| 2013/0031544 A1 | 1/2013 | Sridharan et al. |
| 2014/0019621 A1 | 1/2014 | Khan et al. |

(Continued)

FOREIGN PATENT DOCUMENTS

| CN | 101937438 B | 6/2013 |
| CN | 103200069 A | 7/2013 |

(Continued)

OTHER PUBLICATIONS

VMware "Changing or keeping a UUID for a moved virtual machine," Internet Citation, XP002638739, Jan. 27, 2011 4 pages.

*Primary Examiner* — Sisley N Kim

(74) *Attorney, Agent, or Firm* — Conley Rose, P.C.

(57) ABSTRACT

A data processing method includes receiving, by a source physical machine, a first data packet including first data, and a destination address of the first data is a first virtual machine, generating a second data packet including the first data and an identifier of a second virtual machine, where the second virtual machine is the first virtual machine after being live migrated from the source physical machine to a destination physical machine, and the identifier of the second virtual machine identifies the second virtual machine on the destination physical machine, and sending, by the source physical machine, the second data packet to the destination physical machine.

20 Claims, 25 Drawing Sheets

(56) References Cited

U.S. PATENT DOCUMENTS

| | | | |
|---|---|---|---|
| 2015/0121372 A1 | 4/2015 | Hatta et al. | |
| 2015/0234668 A1* | 8/2015 | Ravinoothala | G06F 9/5088 718/1 |
| 2020/0125397 A1 | 4/2020 | Wu et al. | |
| 2020/0242186 A1 | 7/2020 | Yang et al. | |

FOREIGN PATENT DOCUMENTS

| | | |
|---|---|---|
| CN | 102663023 B | 9/2014 |
| CN | 104243427 A | 12/2014 |
| CN | 106227578 A | 12/2016 |
| CN | 107247619 A | 10/2017 |
| CN | 109144679 A | 1/2019 |
| CN | 110020292 A | 7/2019 |
| WO | 2015027513 A1 | 3/2015 |

\* cited by examiner

First data packet

| MAC address of a third-party physical machine | IP address of a third-party physical machine | IP address of a source physical machine | UDP | VXLAN | MAC address of a third virtual machine | MAC address of a first virtual machine | IP address of a third virtual machine | IP address of a first virtual machine | Playload (data) |
|---|---|---|---|---|---|---|---|---|---|

Second data packet

| MAC address of a source physical machine | MAC address of a destination physical machine | IP address of a source physical machine | IP address of a destination physical machine | UDP | VXLAN (VNI1) | Identifier of a second virtual machine | MAC address of a third virtual machine | MAC address of a second virtual machine | IP address of a third virtual machine | IP address of a second virtual machine | Playload (data) |
|---|---|---|---|---|---|---|---|---|---|---|---|

FIG. 6

Third data packet

| MAC address of a destination physical machine | MAC address of a source physical machine | IP address of a destination physical machine | IP address of a source physical machine | UDP | VXLAN (VNI2) | Identifier of a first virtual machine | MAC address of a second virtual machine | MAC address of a third virtual machine | IP address of a second virtual machine | IP address of a third virtual machine | Playload (data) |

Fourth data packet

| MAC address of a source physical machine | MAC address of a third-party physical machine | IP address of a source physical machine | IP address of a third-party physical machine | UDP | VXLAN | MAC address of a first virtual machine | MAC address of a third virtual machine | IP address of a first virtual machine | IP address of a third virtual machine | Playload (data) |

FIG. 7

Third data packet sent to a gateway

| MAC address of a destination physical machine | MAC address of a gateway physical machine | IP address of a destination physical machine | IP address of a gateway physical machine | UDP | VXLAN (VNI2) | MAC address of a second virtual machine | MAC address of a third virtual machine | IP address of a second virtual machine | IP address of a third virtual machine | Playload (data) |
|---|---|---|---|---|---|---|---|---|---|---|

Third data packet forwarded by a gateway

| MAC address of a gateway physical machine | MAC address of a third-party physical machine | IP address of a gateway physical machine | IP address of a third-party physical machine | UDP | VXLAN | MAC address of a first virtual machine | MAC address of a third virtual machine | IP address of a first virtual machine | IP address of a third virtual machine | Playload (data) |
|---|---|---|---|---|---|---|---|---|---|---|

FIG. 20

DATA PROCESSING METHOD AND RELATED DEVICE

CROSS-REFERENCE TO RELATED APPLICATIONS

This application is a continuation of International Patent Application No. PCT/CN2019/092827 filed on Jun. 25, 2019, which claims priority to Chinese Patent Application No. 201810919527.2 filed on Aug. 13, 2018, and Chinese Patent Application No. 201810659693.3 filed on Jun. 25, 2018. The disclosures of the aforementioned applications are hereby incorporated by reference in their entireties.

TECHNICAL FIELD

The present disclosure relates to the field of virtual machine migration technologies, and in particular, to a data processing method and a related device.

BACKGROUND

Public cloud provides computing resources, such as virtual machine resources, storage resources, and network resources, to the public as services. A public cloud provider leases computing resources to a plurality of tenants. Each tenant can create an independent virtual switch and a virtual subnet to isolate networks. There may be virtual machines of the plurality of tenants on a same physical server/physical machine. Virtual machines of a same tenant may also be distributed on different physical machines. In this architecture, to ensure normal communication between the virtual machines, a virtual switch on each physical machine needs to store necessary information for communication with another virtual machine of the same tenant, for example, an Internet Protocol (IP) address of a host on which the virtual machine is located, and a network identifier for encapsulation of the Virtual Extensible Local Area Network (VXLAN).

In an application, some virtual machines of a same tenant may need to be migrated. For example, when it is found through monitoring that a physical machine is overloaded, performance of a virtual machine (VM) deteriorates, and a central processing unit (CPU) of the VM is excessively high due to resource preemption, a migration operation needs to be performed, to migrate the corresponding VM to another physical machine that still has available resources. To ensure that a service is not interrupted during migration, a live migration technology, that is, virtual machine saving/restoration, is usually used. To be specific, a running status of the entire virtual machine is saved such that the entire virtual machine can be quickly restored to an original hardware platform or even a different hardware platform. After restoration, the virtual machine still runs smoothly, and users perceives no difference.

An important criterion for measuring virtual machine live migration is network interruption time. The network interruption time is entire duration in which a network packet is lost or a network service is affected in a virtual machine live migration process. To ensure that a network is not interrupted, a same network configuration as that of a source physical machine needs to be delivered to a destination physical machine, and a virtual switch on a third-party physical machine needs to be instructed to update configuration information for communication with a virtual machine after migration after the virtual machine is migrated. In this way, network communication between the virtual machine and another virtual machine can be restored in a timely manner after the virtual machine is migrated. For example, a plurality of cloud servers of a tenant is distributed on different physical machines. In a process of migrating a virtual machine from a source physical machine to a destination physical machine, if a network configuration of a virtual machine after migration is not updated on the destination physical machine in a timely manner, or if configuration information for communicating with the virtual machine after migration is not updated on another virtual machine of the tenant in a timely manner after the virtual machine is migrated, a network packet may be lost or a network service may be affected. For common services, if a VM network is interrupted for more than 3 seconds, a network service is affected, thereby affecting user experience. For real-time services such as games, if the VM network is interrupted for more than 1 second, a service may be frozen or even interrupted.

Therefore, how to ensure that a network is not interrupted in a virtual machine live migration process is an urgent problem to be resolved.

SUMMARY

Embodiments of the present disclosure provide a data processing method and a related device, to resolve a network interruption problem in a virtual machine live migration process.

According to a first aspect, an embodiment of the present disclosure provides a data processing method, including receiving, by a source physical machine, a first data packet, where the first data packet includes first data, and a destination address of the first data is a first virtual machine, generating, by the source physical machine, a second data packet, where the second data packet includes the first data and an identifier of a second virtual machine, the second virtual machine is the first virtual machine after being live migrated from the source physical machine to a destination physical machine, and the identifier of the second virtual machine is used to identify the second virtual machine on the destination physical machine, and sending, by the source physical machine, the second data packet to the destination physical machine.

In this embodiment of the present disclosure, in a virtual machine live migration process, when a network configuration of a virtual machine after migration is not updated on the destination physical machine in a timely manner, or when configuration information for communicating with the virtual machine after migration is not updated on another virtual machine of a same tenant in a timely manner after the virtual machine is migrated, and a virtual machine on a third-party physical machine does not store an address of the destination physical machine on which the to-be-migrated virtual machine is located, a packet of uplink first data sent to the first virtual machine on the source physical machine may be lost. This can avoid network interruption and improve user experience.

In a possible implementation, the method further includes receiving, by the source physical machine, a third data packet sent by the destination physical machine, where the third data packet includes second data and an identifier of the first virtual machine, the identifier of the first virtual machine is used to identify the first virtual machine on the source physical machine, and a destination address of the second data is a third virtual machine, determining, by the source physical machine according to the identifier of the first virtual machine, an address of a third-party physical machine on which the third virtual machine is located, generating, by the source physical machine, a fourth data packet according to the address of the third-party physical machine, where the fourth data packet includes the second data, and sending, by the source physical machine, the fourth data packet to the third-party physical machine.

In this embodiment of the present disclosure, in a virtual machine live migration process, when a network configuration of a virtual machine after migration is not updated on the destination physical machine in a timely manner after the virtual machine is migrated, and the second virtual machine needs to communicate with the third virtual machine on the third-party physical machine but does not store the address of the third-party physical machine on which the third virtual machine is located, a packet of downlink data may be lost. This can avoid network interruption and improve user experience.

In a possible implementation, the third virtual machine is a virtual machine that has an interaction relationship with the first virtual machine, and determining, by the source physical machine according to the identifier of the first virtual machine, an address of a third-party physical machine on which the third virtual machine is located includes obtaining, by the source physical machine according to the identifier of the first virtual machine, configuration information of the first virtual machine, where the configuration information includes the address of the third-party physical machine on which the third virtual machine is located, and searching for and determining, by the source physical machine according to the configuration information, the address of the third-party physical machine on which the third virtual machine is located. In this embodiment of the present disclosure, before network configuration information of the second virtual machine is completed on the destination physical machine, the source physical machine further stores the configuration information of the first virtual machine, to forward uplink or downlink data for the second virtual machine.

In a possible implementation manner, migration information of the first virtual machine is not updated on the third virtual machine, where the migration information includes an address of the destination physical machine on which the second virtual machine is located.

In a possible implementation, the method further includes deleting, by the source physical machine, the configuration information of the first virtual machine if the source physical machine does not receive the first data packet within a preset time period. In this embodiment of the present disclosure, after the migration information of the first virtual machine is updated for all related virtual machines on the third-party physical machine, the configuration information of the first virtual machine may be deleted, without a need to forward data.

In a possible implementation, the network configuration information includes a network configuration of layer-2 communication, layer-3 communication, and Elastic IP (EIP) communication for sending and receiving the data by the second virtual machine. This meets network configuration requirements for data transmission during virtual machine live migration in a distributed hierarchical networking scenario.

In a possible implementation, a source address of the first data is the third virtual machine, a destination address of the second data is the third virtual machine, and the second data is data in response to the first data or the first data is data in response to the second data. That is, when a data packet is sent from the third-party physical machine and forwarded to the destination physical machine using the source physical machine, when feeding back data to the third-party physical machine, the third-party physical machine also feeds back or sends the data using a symmetric path, to avoid a packet loss caused by asymmetric traffic transmission.

According to a second aspect, an embodiment of the present disclosure provides a data processing method, including receiving, by a source physical machine, a third data packet sent by a destination physical machine, where the third data packet includes second data and an identifier of a first virtual machine, the identifier of the first virtual machine is used to identify the first virtual machine on the source physical machine, and a destination address of the second data is a third virtual machine, determining, by the source physical machine according to the identifier of the first virtual machine, an address of a third-party physical machine on which the third virtual machine is located, generating, by the source physical machine, a fourth data packet according to the address of the third-party physical machine, where the fourth data packet includes the second data, and sending, by the source physical machine, the fourth data packet to the third-party physical machine.

In a possible implementation, the method further includes receiving, by the source physical machine, a first data packet, where the first data packet includes first data, and a destination address of the first data is a first virtual machine, generating, by the source physical machine, a second data packet, where the second data packet includes the first data and an identifier of a second virtual machine, the first virtual machine is the second virtual machine after being live migrated from the source physical machine to the destination physical machine, and the identifier of the second virtual machine is used to identify the second virtual machine on the destination physical machine, and sending, by the source physical machine, the second data packet to the destination physical machine.

In a possible implementation, the third virtual machine is a virtual machine that has an interaction relationship with the first virtual machine, and determining, by the source physical machine according to the identifier of the first virtual machine, an address of a third-party physical machine on which the third virtual machine is located includes obtaining, by the source physical machine according to the identifier of the first virtual machine, configuration information of the first virtual machine, where the configuration information includes the address of the third-party physical machine on which the third virtual machine is located, and searching for and determining, by the source physical machine according to the configuration information, the address of the third-party physical machine on which the third virtual machine is located.

In a possible implementation manner, migration information of the first virtual machine is not updated on the third virtual machine, where the migration information includes an address of the destination physical machine on which the second virtual machine is located.

In a possible implementation, the method further includes deleting, by the source physical machine, the configuration information of the first virtual machine if the source physical machine does not receive the first data packet within a preset time period.

According to a third aspect, an embodiment of the present disclosure provides a data processing method, including receiving, by a destination physical machine, a second data packet sent by a source physical machine, where the second data packet is generated by the source physical machine according to a received first data packet, the first data packet includes first data, a destination address of the first data is a first virtual machine, the second data packet includes the first data and an identifier of a second virtual machine, the first virtual machine is the second virtual machine after being live migrated from the source physical machine to the destination physical machine, and the identifier of the second virtual machine is used to identify the second virtual machine on the destination physical machine, and determining, by the destination physical machine according to the identifier of the second virtual machine, that the first data is data to be sent to the second virtual machine.

In a possible implementation, the method further includes sending, by the destination physical machine, a third data packet to the source physical machine, where the third data packet includes second data and an identifier of the first virtual machine, a destination address of the second data is a third virtual machine, and the identifier of the first virtual machine is used to identify the first virtual machine on the source physical machine.

In a possible implementation, network configuration information of the second virtual machine is not currently completed on the destination physical machine, and the network configuration information includes at least one of a configuration rule of layer-2 communication, a configuration rule of layer-3 communication, and a configuration rule of EIP communication.

According to a fourth aspect, an embodiment of the present disclosure provides a data processing method, including sending, by a destination physical machine, a third data packet to a source physical machine, where the third data packet includes second data and an identifier of a first virtual machine, a destination address of the second data is a third virtual machine, and the identifier of the first virtual machine is used to identify the first virtual machine on the source physical machine.

In a possible implementation, the destination physical machine receives a second data packet sent by the source physical machine, where the second data packet is generated by the source physical machine according to a received first data packet, the first data packet includes first data, a destination address of the first data is a first virtual machine, the second data packet includes the first data and an identifier of a second virtual machine, and the first virtual machine is the second virtual machine after being live migrated from the source physical machine to the destination physical machine, and the identifier of the second virtual machine is used to identify the second virtual machine on the destination physical machine, and the destination physical machine determines, according to the identifier of the second virtual machine, that the first data is data to be sent to the second virtual machine.

In a possible implementation, network configuration information of the second virtual machine is not currently completed on the destination physical machine, and the network configuration information includes at least one of a configuration rule of layer-2 communication, a configuration rule of layer-3 communication, and a configuration rule of EIP communication.

According to a fifth aspect, an embodiment of the present disclosure provides a physical machine, where the physical machine is a source physical machine and include a first receiving unit configured to receive a first data packet, where the first data packet includes first data, and a destination address of the first data is a first virtual machine, a first processing unit configured to generate a second data packet, where the second data packet includes the first data and an identifier of a second virtual machine, the second virtual machine is the first virtual machine after being live migrated from the source physical machine to a destination physical machine, and the identifier of the second virtual machine is used to identify the second virtual machine on the destination physical machine, and a first sending unit configured to send the second data packet to the destination physical machine.

In a possible implementation, the physical machine further includes a second receiving unit configured to receive a third data packet sent by the destination physical machine, where the third data packet includes second data and an identifier of the first virtual machine, the identifier of the first virtual machine is used to identify the first virtual machine on the source physical machine, and a destination address of the second data is a third virtual machine, an identification unit configured to determine, according to the identifier of the first virtual machine, an address of a third-party physical machine on which the third virtual machine is located, a second processing unit configured to generate a fourth data packet according to the address of the third-party physical machine, where the fourth data packet includes the second data, and a second sending unit configured to send the fourth data packet to the third-party physical machine.

In a possible implementation, the third virtual machine is a virtual machine that has an interaction relationship with the first virtual machine, and the identification unit is further configured to obtain, according to the identifier of the first virtual machine, configuration information of the first virtual machine, where the configuration information includes the address of the third-party physical machine on which the third virtual machine is located, and search for and determine, according to the configuration information, the address of the third-party physical machine on which the third virtual machine is located.

In a possible implementation manner, migration information of the first virtual machine is not updated on the third virtual machine, where the migration information includes an address of the destination physical machine on which the second virtual machine is located.

In a possible implementation, the physical machine further includes a management unit configured to delete the configuration information of the first virtual machine if the first data packet is not received within a preset time period.

According to a sixth aspect, an embodiment of the present disclosure provides a physical machine, where the physical machine is a destination physical machine and includes a receiving unit configured to receive a second data packet sent by a source physical machine, where the second data packet is generated by the source physical machine according to a received first data packet, the first data packet includes first data, a destination address of the first data is a first virtual machine, the second data packet includes the first data and an identifier of a second virtual machine, the first virtual machine is the second virtual machine after being live migrated from the source physical machine to the destination physical machine, and the identifier of the second virtual machine is used to identify the second virtual machine on the destination physical machine, and a processing unit configured to determine, according to the identifier of the second virtual machine, that the first data is data to be sent to the second virtual machine.

In a possible implementation, the physical machine further includes a sending unit configured to send a third data packet to the source physical machine, where the third data packet includes second data and an identifier of the first virtual machine, a destination address of the second data is a third virtual machine, and the identifier of the first virtual machine is used to identify the first virtual machine on the source physical machine.

In a possible implementation, network configuration information of the second virtual machine is not currently completed on the destination physical machine, and the network configuration information includes at least one of a configuration rule of layer-2 communication, a configuration rule of layer-3 communication, and a configuration rule of EIP communication.

According to a seventh aspect, an embodiment of the present disclosure provides a data processing method, including receiving, by a destination physical machine, a second data packet sent by a source physical machine, where the second data packet is generated by the source physical machine according to a received first data packet, the first data packet includes first data, a destination address of the first data is a first virtual machine, the first virtual machine is a second virtual machine after being live migrated from the source physical machine to the destination physical machine, network configuration information of the second virtual machine has been preconfigured on the destination physical machine, and the network configuration information includes a first network configuration for receiving data by the second virtual machine, and determining, by the destination physical machine according to the first network configuration, that the first data is data to be sent to the second virtual machine.

In this embodiment of the present disclosure, the network configuration information of the virtual machine after migration is preconfigured on the destination physical machine to which the virtual machine needs to be live migrated. Therefore, it may be correctly identified, according to the first network configuration, that a data packet that is sent by a third virtual machine on a third-party physical machine and forwarded by the source physical machine is sent to the virtual machine after migration. This can avoid a packet loss of received data on the destination physical machine due to a lack of the network configuration information, reduce entire duration in which the third-party physical machine updates migration information of the second virtual machine, and reduce duration and a probability of network interruption.

In a possible implementation manner, before receiving, by a destination physical machine, a second data packet sent by a source physical machine, the method further includes preconfiguring, by the destination physical machine, the network configuration information of the second virtual machine before the first virtual machine is migrated to the destination physical machine. In this embodiment of the present disclosure, the network configuration information of the virtual machine after migration is preconfigured on the destination physical machine to which the virtual machine needs to be live migrated. This can avoid a packet loss or network interruption due to a lack of the network configuration information on the destination physical machine, reduce entire duration in which the third-party physical machine updates migration information of the second virtual machine, and reduce duration and a probability of network interruption.

In a possible implementation, the first network configuration includes a network configuration of layer-2 communication, layer-3 communication, and EIP communication for receiving data by the second virtual machine. This meets network configuration requirements for data transmission during virtual machine live migration in a distributed hierarchical networking scenario.

In a possible implementation, the network configuration information further includes a second network configuration for sending data by the second virtual machine, and the second network configuration includes a network configuration of layer-2 communication, layer-3 communication, and EIP communication for sending the data by the second virtual machine, and the method further includes sending, by the destination physical machine according to the second network configuration, a third data packet to the third-party physical machine, where the third data packet includes second data, a destination address of the second data is a third virtual machine, and the third virtual machine is a virtual machine that has an interaction relationship with the first virtual machine. In this embodiment of the present disclosure, the configuration in the network configuration information may be preconfigured before the virtual machine is migrated such that the destination physical machine may receive the data according to the first network configuration and send the data according to the second network configuration. This can avoid a packet loss due to a lack of the network configuration information, reduce entire duration in which the third-party physical machine updates migration information of the second virtual machine, and reduce duration and a probability of network interruption.

In a possible implementation, the network configuration information further includes routing information of a gateway node, the gateway node stores an address of the third-party physical machine on which the third virtual machine is located, and the third virtual machine is the virtual machine that has an interaction relationship with the first virtual machine, and the method further includes forwarding, by the destination physical machine according to the routing information, the third data packet to the third-party physical machine using the gateway node, where the third data packet includes the second data, and the destination address of the second data is the third virtual machine. In this embodiment of the present disclosure, the first network configuration of the received data may be preconfigured before the virtual machine is migrated such that the destination physical machine may receive the data according to the first network configuration. A network configuration included in the first network configuration is relatively fixed and therefore is completed within a relatively short period of time. The second network configuration (which needs to include configurations of a plurality of associated third virtual machines) for sending the data by the destination physical machine may need to be completed within a relatively long period of time. Therefore, in this embodiment of the present disclosure, during preconfiguration, the first network configuration is first completed, the virtual machine may start to be migrated, and the second network configuration may be performed when or after the virtual machine starts to be migrated. In this period, a data packet that needs to be sent by the destination physical machine is forwarded using the gateway node. This can avoid a packet loss due to a lack of the network configuration information, reduce entire duration in which the third-party physical machine updates migration information of the second virtual machine, and further reduce duration and a probability of network interruption.

According to an eighth aspect, an embodiment of the present disclosure provides a data processing method, including receiving, by a source physical machine, a first data packet, where the first data packet includes first data, and a destination address of the first data is a first virtual machine, generating, by the source physical machine, a second data packet, where the second data packet includes the first data, and the second virtual machine is the first virtual machine after being live migrated from the source physical machine to a destination physical machine, and sending, by the source physical machine, the second data packet to the destination physical machine.

According to a ninth aspect, an embodiment of the present disclosure provides a physical machine, where the physical machine is a destination physical machine and includes a receiving unit configured to receive a second data packet sent by a source physical machine, where the second data packet is generated by the source physical machine according to a received first data packet, the first data packet includes first data, a destination address of the first data is a first virtual machine, the first virtual machine is a second virtual machine after being live migrated from the source physical machine to the destination physical machine, network configuration information of the second virtual machine has been preconfigured on the destination physical machine, and the network configuration information includes a first network configuration for receiving data by the second virtual machine, and an identification unit configured to determine, according to the first network configuration, that the first data is data to be sent to the second virtual machine.

In a possible implementation, the physical machine further includes a preconfiguration unit configured to preconfigure the network configuration information of the second virtual machine before the first virtual machine is migrated to the destination physical machine.

In a possible implementation, the first network configuration includes a network configuration of layer-2 communication, layer-3 communication, and EIP communication for receiving the data by the second virtual machine.

In a possible implementation, the network configuration information further includes a second network configuration for sending data by the second virtual machine, and the second network configuration includes a network configuration of layer-2 communication, layer-3 communication, and EIP communication for sending the data by the second virtual machine, and the physical machine further includes a first sending unit configured to send, according to the second network configuration, a third data packet to a third-party physical machine, where the third data packet includes second data, a destination address of the second data is a third virtual machine, and the third virtual machine is a virtual machine that has an interaction relationship with the first virtual machine.

In a possible implementation, the network configuration information further includes routing information of a gateway node, the gateway node stores an address of a third-party physical machine on which the third virtual machine is located, and the third virtual machine is the virtual machine that has an interaction relationship with the first virtual machine, and the physical machine further includes a second sending unit configured to forward, according to the routing information, a third data packet to the third-party physical machine using the gateway node, where the third data packet includes second data, and a destination address of the second data is the third virtual machine.

According to a tenth aspect, an embodiment of the present disclosure provides a physical machine, where the physical machine is a source physical machine and include a receiving unit configured to receive a first data packet, where the first data packet includes first data, and a destination address of the first data is a first virtual machine, a processing unit configured to generate a second data packet, where the second data packet includes the first data, and the first virtual machine is a second virtual machine after being live migrated from the source physical machine to a destination physical machine, and a sending unit configured to send the second data packet to the destination physical machine.

According to an eleventh aspect, an embodiment of the present disclosure provides a data processing system, including a source physical machine and a destination physical machine, where the source physical machine is the source physical machine in any implementation of the fifth aspect, and the destination physical machine is the destination physical machine in any implementation of the sixth aspect, or the source physical machine is the source physical machine in any implementation of the tenth aspect, and the destination physical machine is the destination physical machine in any implementation of the ninth aspect.

According to a twelfth aspect, an embodiment of the present disclosure provides a physical machine, where the physical machine includes a processor, and the processor is configured to support the physical machine to perform corresponding functions in the data processing method according to the first aspect, the second aspect, the third aspect, the fourth aspect, the seventh aspect, or the eighth aspect. The physical machine may further include a memory. The memory is coupled to the processor, and configured to store a program instruction and data that are necessary to the physical machine. The physical machine may further include a communications interface used for communication between the physical machine and another device or a communications network.

According to a thirteenth aspect, an embodiment of the present disclosure provides a computer storage medium configured to store a computer software instruction used by the processor in the physical machine according to the fifth aspect, the sixth aspect, the ninth aspect, and the tenth aspect. The computer software instruction is included in a program designed for executing the foregoing aspects.

According to a fourteenth aspect, an embodiment of the present disclosure provides a computer program, where the computer program includes an instruction, and when the computer program is executed by a computer, the computer is enabled to perform a procedure performed by the processor in the physical machine according to the thirteenth aspect.

According to a fifteenth aspect, this application provides a chip system. The chip system includes a processor configured to support the physical machine to perform functions according to the first aspect, the second aspect, the third aspect, the fourth aspect, the seventh aspect, or the eighth aspect, for example, generating or processing information in the foregoing data processing method. In a possible design, the chip system further includes a memory. The memory is configured to store a program instruction and data that are necessary for a data sending device. The chip system may include a chip, or may include a chip and another discrete component.

BRIEF DESCRIPTION OF DRAWINGS

To describe the technical solutions in some of the embodiments of the present disclosure more clearly, the following briefly describes the accompanying drawings describing some of the embodiments of the present disclosure.

FIG. 6 is a schematic diagram of a packet encapsulation format of a first data packet and a second data packet according to an embodiment of the present disclosure.

FIG. 7 is a schematic diagram of a packet encapsulation format of a third data packet and a fourth data packet according to an embodiment of the present disclosure.

FIG. 20 is a schematic diagram of a packet encapsulation format before and after a third data packet is forwarded using a gateway node according to an embodiment of the present disclosure.

DESCRIPTION OF EMBODIMENTS

Figure 1:
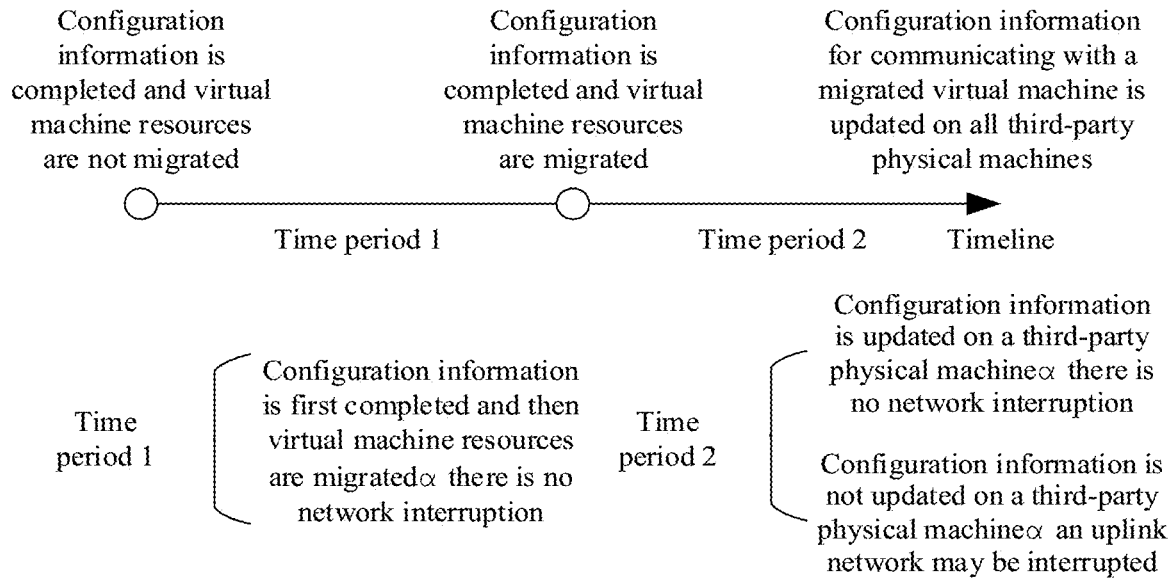
FIG. 1 is a schematic diagram of network interruption corresponding to virtual machine live migration according to an embodiment of the present disclosure.

The following describes the embodiments of the present disclosure with reference to the accompanying drawings in the embodiments of the present disclosure.

In the specification, claims, and accompanying drawings of this application, the terms "first", "second", "third", "fourth" and so on are intended to distinguish between different objects but do not indicate a particular order. In addition, the terms "including", "having", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in the specification means that a particular characteristic, structure, or feature described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that the embodiments described in the specification may be combined with another embodiment.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate using a local and/or remote process and according to, for example, a signal having one or more data packets (for example, data from two components interacting with another component in a local system, a distributed system, and/or across a network such as the internet interacting with other systems using the signal).

Some terms in this application are first described, to help persons skilled in the art have a better understanding.

(1) Virtual machine live migration, dynamic migration, or real-time migration, is equivalent to virtual machine saving/restoration, and usually saves a running status of an entire virtual machine completely and quickly restores the virtual machine to an original hardware platform or an even different hardware platform. After restoration, the virtual machine still runs smoothly, and users perceives no difference.

(2) Virtual switch (vSwitch) is a software program that enables one virtual machine to communicate with another one. Similar to a physical Ethernet switch, the vSwitch checks a data packet before transmitting it to control packet sending and receiving.

(3) Interruption time indicates entire duration in which a network packet is lost or a network service is affected in a virtual machine live migration process.

(4) Hierarchical architecture, where components in a solution are divided into different layers. Components at each layer keep cohesive and are roughly abstracted at the same level. Each layer is loosely coupled with its lower layers.

(5) VXLAN is a network virtualization technology, and attempts to improve extension during deployment of large-scale cloud computing. VXLAN is an extension of virtual local area network (VLAN). A length of a VLAN header is 12 bits and a maximum quantity of VLANs is 4096 ($2^{12}$=4096), which cannot meet requirements for ever-increasing VLANs.

(6) VXLAN network identifier (VNI) is similar to a VLAN ID and is used to distinguish a VXLAN segment. Virtual machines in different VXLAN segments cannot directly communicate with each other at layer 2. A VNI represents one tenant, even if a plurality of terminal users belong to the same VNI. A VNI consists of 24 bits and supports a maximum of 16M (($2^{24}$−1)/$1024^2$) tenants.

(7) Media access control (MAC) address is used to define a location of a network device. In an Open Systems Interconnection (OSI) model, a layer 3 network layer is for IP addresses, and a layer 2 data link layer is for MAC addresses. Therefore, a host has a MAC address, and each network location has an IP address dedicated to the host.

First, the technical problem to be resolved by this application is analyzed and proposed. An actual application scenario corresponding to the technical problem to be resolved in the embodiments of this application is first described and analyzed. In this application, virtual machine live migration is classified into two cases. In a first case, virtual machine resources are first migrated and then configuration information is completed. In a second case, configuration information is first completed and then virtual machine resources are migrated. The virtual machine resources may include resources such as a virtual processor (vCPU), a virtual memory (vMEM), a virtual network interface card (vNIC), and virtual storage (vStorage). The configuration information may include configuration information such as a flow rule for layer-2 communication, a route and a flow rule for layer-3 communication, a network address translation (NAT) rule, a security group, and quality of service (QoS) for EIP communication.

The following analysis is provided for possible network interruption in the preceding two cases.

In the second case, configuration information is first completed and then virtual machine resources are migrated.

Refer to FIG. 1. FIG. 1 is a schematic diagram of network interruption corresponding to virtual machine live migration according to an embodiment of the present disclosure. As shown in FIG. 1, migration may be completed in a time period 1 and a time period 2.

The time period 1 is a period after (the configuration information is completed and the virtual machine resources are not migrated) and before (the configuration information is completed and the virtual machine resources are migrated).

In the time period 1, regardless of whether the configuration information is completed on a destination physical machine, as long as the current virtual machine resources are not live migrated from a source physical machine to the destination physical machine, a virtual machine (assumed as a first virtual machine) on the source physical machine may work normally. Uplink traffic or downlink traffic at this time is processed by the first virtual machine. Therefore, there is no network packet loss caused by live migration, that is, there is no network interruption in the time period 1.

The time period 2 is a period after (the configuration information is completed and the virtual machine resources are migrated) and before (configuration information for communicating with a virtual machine after migration is updated on all third-party physical machines).

In the time period 2, a management physical machine (a control node) does not instruct the third-party physical machine (which may be a source physical machine, a destination physical machine, or another physical machine) to update the configuration information for communicating with the virtual machine after migration only after the virtual machine resources are migrated on the destination physical machine and the configuration information is completed. Therefore, in the time period 2, the configuration information may need to be updated on a plurality of third-party physical machines but is updated at different speeds. When any one of the virtual machines whose configuration information is not updated needs to send an uplink data packet (assumed as a first data packet) to the first virtual machine, because an address of the source physical machine on which the first virtual machine before migration is located is currently stored, and an address of the destination physical machine on which a second virtual machine after migration is located is not stored, the uplink data packet can be first sent only to the first virtual machine. However, the first virtual machine has been migrated to the destination physical machine, and cannot normally receive and process the data packet. As a result, a packet is lost in an uplink network, that is, the uplink network is interrupted. Because the virtual machine resources have been migrated and the configuration information has been completed on the destination physical machine in the time period 2, the destination physical machine can work normally. When the destination physical machine needs to send a downlink data packet (assumed as a third data packet), the destination physical machine directly communicates with a third-party physical machine that needs to communicate with the destination physical machine. Therefore, there is no network packet loss caused by live migration, and there is no downlink network interruption.

In the first case, virtual machine resources are first migrated and then configuration information is completed.

Figure 2:
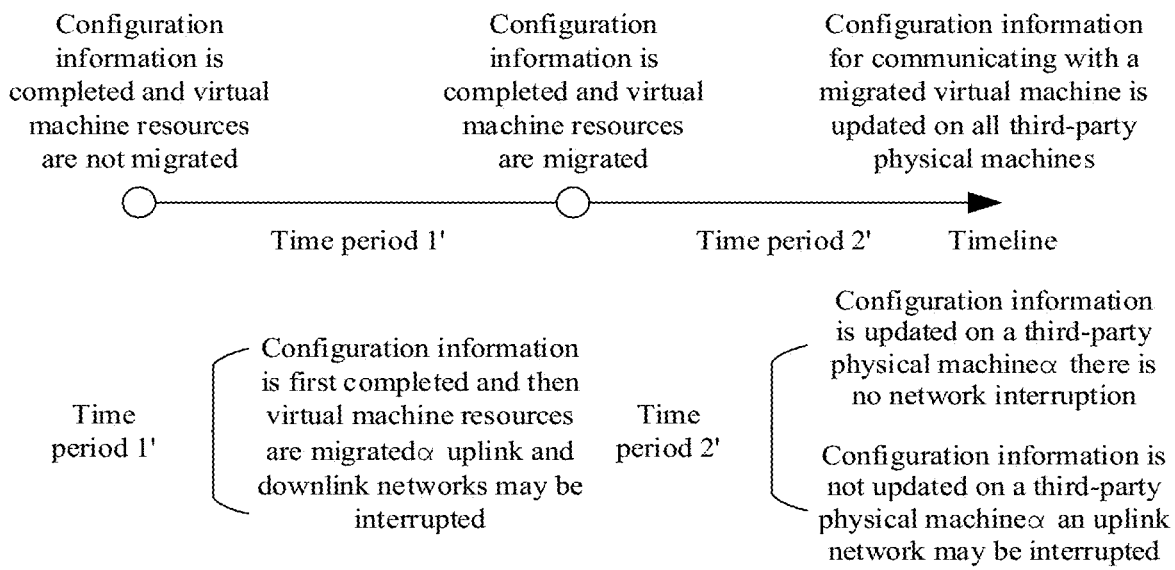
FIG. 2 is a schematic diagram of another network interruption corresponding to virtual machine live migration according to an embodiment of the present disclosure.

Refer to FIG. 2. FIG. 2 is a schematic diagram of another network interruption corresponding to virtual machine live migration according to an embodiment of the present disclosure. As shown in FIG. 2, migration may be completed in a time period 1' and a time period 2'.

The time period 1' is a period after (the virtual machine resources are migrated and the configuration information is not completed) and before (the virtual machine resources are migrated and the configuration information is completed).

In the time period 1', a first virtual machine on a source physical machine has been migrated to a destination physical machine, there is no first virtual machine on the source physical machine, and there is only a second virtual machine but it is not configured on the destination physical machine. In this case, when an associated virtual machine sends uplink data (assumed as a first data packet) to the first virtual machine, because there is no first virtual machine on the source physical machine, the first data packet cannot be processed and can only be discarded. In this case, when the second virtual machine on the destination physical machine needs to send downlink data (assumed as a third data packet) to the associated virtual machine (assumed as a third virtual machine), configuration information is not completed on the destination physical machine and an address of a physical machine on which the third virtual machine is located cannot be learned, and therefore the downlink data fails to be sent. Therefore, there may be uplink or downlink network packet loss caused by live migration, that is, network interruption may occur in the time period 1'.

The time period 2' is a period after (the configuration information is completed and the virtual machine resources are migrated) and before (configuration information for communicating with a virtual machine after migration is updated on all third-party physical machines).

It may be understood that network interruption corresponding to the time period 2' in the second case is the same as network interruption corresponding to the time period 2 in the first case. Details are not described herein again.

It should be noted that, a time period in a virtual machine resource migration process does not need to be considered in the virtual machine live migration process, because before the virtual machine is migrated from the source physical machine to the destination physical machine, if the virtual machine is not completely migrated, the virtual machine on the source physical machine still runs normally.

In conclusion, the technical problem to be actually resolved by this application is how to avoid a network packet loss caused by live migration in the foregoing two cases. That is, when a network configuration of a virtual machine after migration is not updated on the destination physical machine in a timely manner, or when the configuration information for communicating with the virtual machine after migration is not updated on another virtual machine of a same tenant in a timely manner after the virtual machine is migrated, how to ensure that virtual machines of the same tenant can normally exchange data with each other, and to reduce or avoid network interruption.

For ease of understanding this embodiment of the present disclosure, the following lists virtual machine live migration scenarios to which a data processing method in this application is applied as an example. The following scenarios may be included.

In a first scenario, a hardware system of a source physical machine needs to be maintained, troubleshooted, and upgraded, but a virtual machine running on the source physical machine cannot be shut down. Therefore, the virtual machine needs to be live migrated from the source physical machine to a destination physical machine.

In a second scenario, a software system of a source physical machine is upgraded, and a patch is installed. These operations take effect only after a physical machine is restarted, but a virtual machine running on the source physical machine cannot be shut down. To avoid affecting the virtual machine running on the source physical machine, before the upgrade and patch installation, the virtual machine needs to be live migrated from the source physical machine to a destination physical machine.

In a third scenario, a source physical machine is overloaded, and a virtual machine running on the source physical machine cannot be shut down. Therefore, the virtual machine needs to be live migrated from the source physical machine to a destination physical machine, to reduce a quantity of virtual machines on the source physical machine and release resources.

In a fourth scenario, in a cluster, there are a large quantity of virtual machines on a source physical machine and a small quantity of virtual machines on a destination physical machine, and a virtual machine running on a source physical machine cannot be shut down. Therefore, the virtual machine needs to be live migrated from the source physical machine to a destination physical machine, to achieve resource balancing.

It may be understood that the four application scenarios are merely several example implementations in this embodiment of the present disclosure, and the application scenarios in this embodiment of the present disclosure include but are not limited to the foregoing application scenarios.

Figure 3:
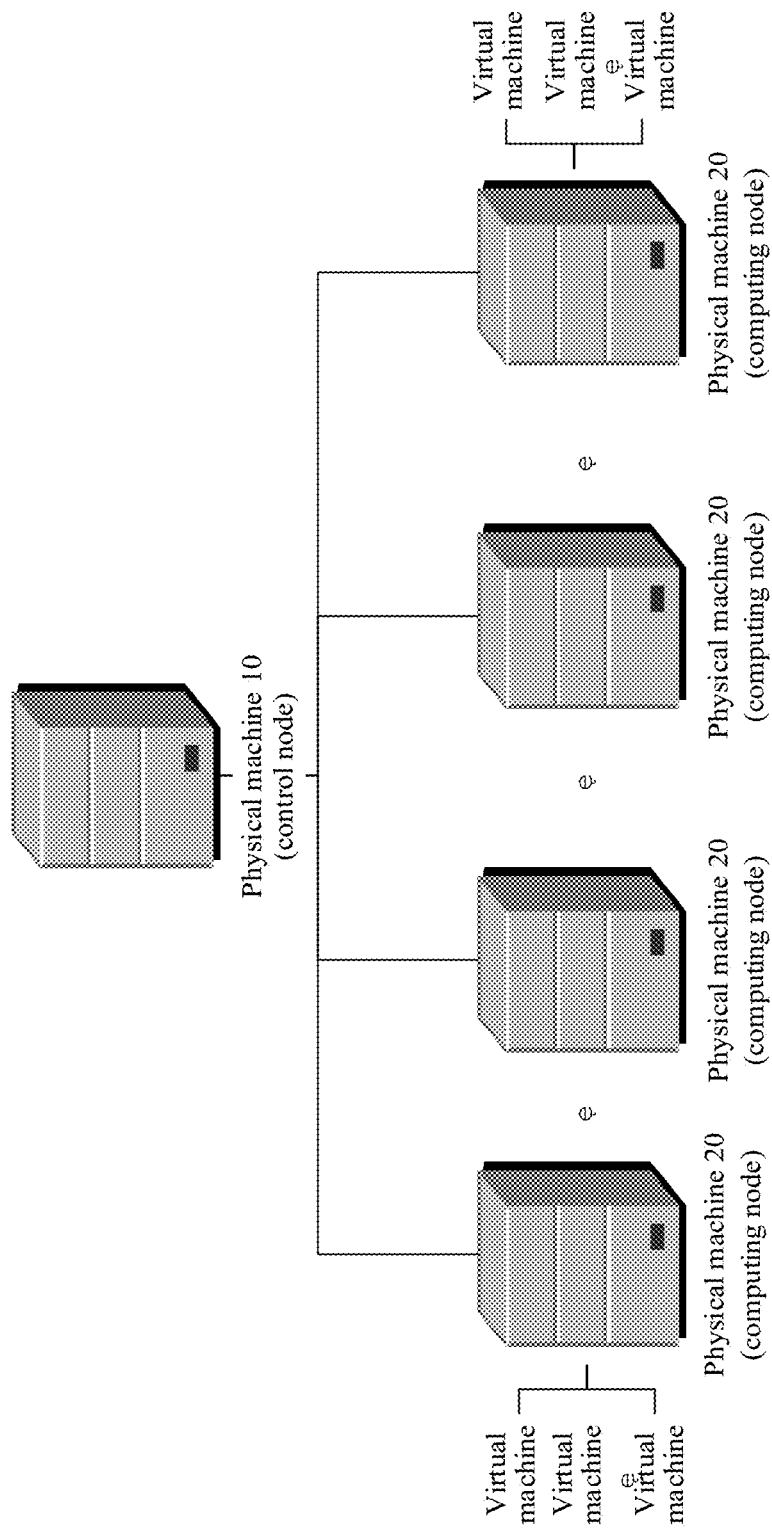
FIG. 3 is a schematic diagram of an architecture of a server according to an embodiment of the present disclosure.

Based on the foregoing technical problem and the corresponding application scenarios in this application, for ease of understanding of this embodiment of the present disclosure, the following first describes one server architecture in this embodiment of the present disclosure. Refer to FIG. 3. FIG. 3 is a schematic diagram of an architecture of a server according to an embodiment of the present disclosure. The server architecture includes at least one physical machine 10 used as a control node and a plurality of physical machines 20 used as a computing node. The physical machine 10 is configured to manage computing resources, network resources, and the like in the plurality of connected physical machines 20. A plurality of virtual machines may be deployed on the physical machine 20, and may be live migrated under management of the physical machine 10. Any physical machine 20 may be used as a source physical machine in this application, from which a virtual machine is migrated to another physical machine 20, or may be used as a destination physical machine, to which a virtual machine is migrated from a source physical machine. It may be understood that the server architecture in FIG. 3 is merely an example implementation of this embodiment of the present disclosure, and a network in this embodiment of the present disclosure includes but is not limited to the server architecture.

Figure 4:
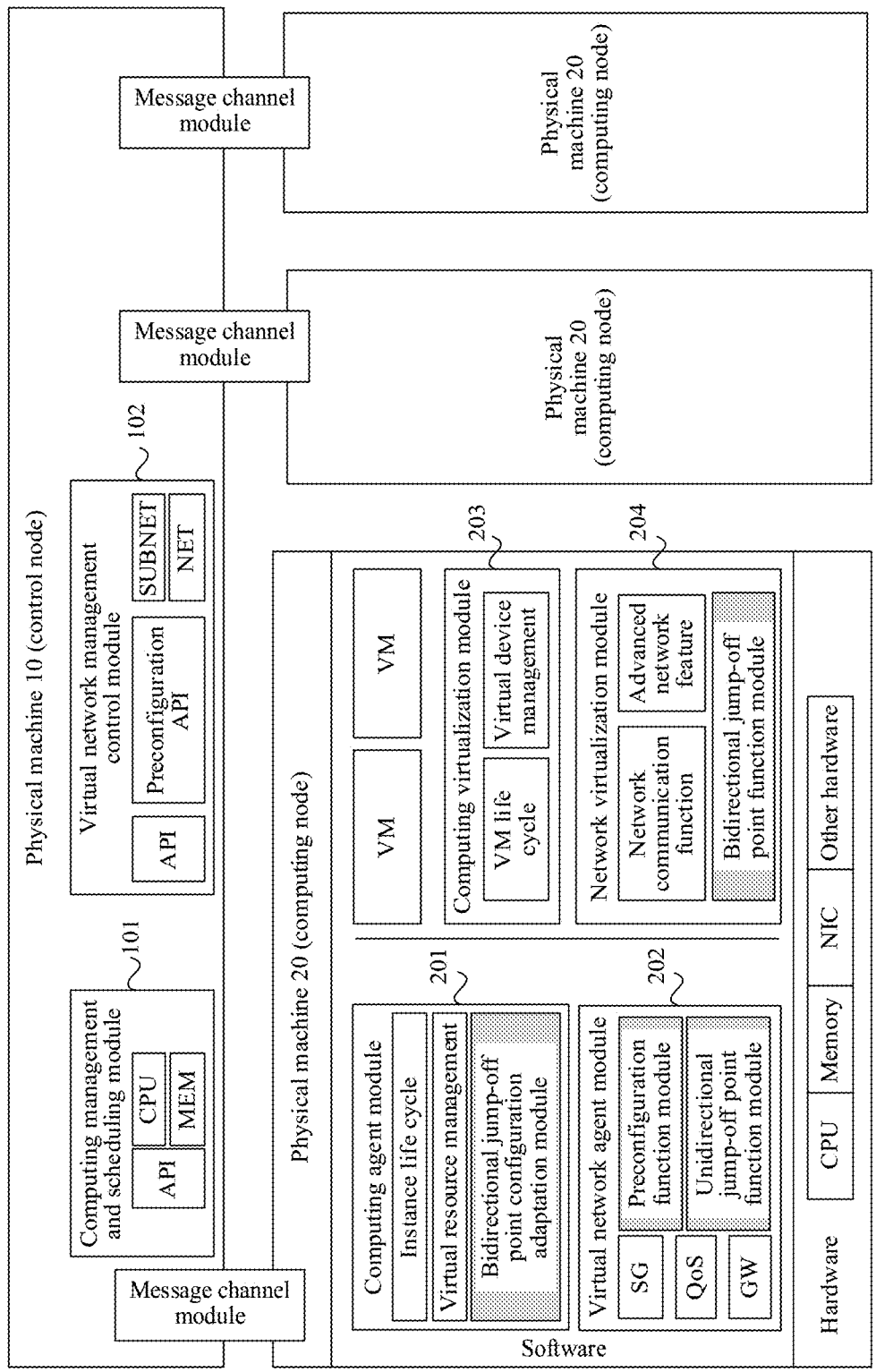
FIG. 4 is a schematic diagram of a structure of a control node physical machine and a computing node physical machine according to an embodiment of the present disclosure.

This embodiment of the present disclosure provides the physical machine 10 and the physical machine 20 applicable to the server architecture. Refer to FIG. 4. FIG. 4 is a schematic diagram of a structure of a control node physical machine and a computing node physical machine according to this embodiment of the present disclosure. The physical machine 10 used as the control node may include a virtual computing management and scheduling module 101 and a virtual network management control module 102. The physical machine 20 used as the computing node may include a computing agent module 201, a virtual network agent module 202, a computing virtualization module 203, and a network virtualization module 204.

The virtual computing management and scheduling module 101 is a platform configured to manage all computing resources, networks, authentication, scheduling, and scalability, provides a standard computing application program interface (API) for an external system, and internally is connected to the computing agent module.

The virtual network management control module 102 is a platform configured to allocate a virtual network and manage virtual network resources, provides a standard network resource API for an external system, and internally is connected to the virtual network agent module. In this application, a preconfiguration API is added to the virtual network management control module. This module is configured to be invoked when the computing agent module performs a live migration operation, and deliver a network configuration to a destination physical machine for migration.

The computing agent module 201 is a module configured to manage a lifecycle of a virtual machine on a physical machine (computing node), including creating, terminating, migrating, and resizing an instance. In this application, a bidirectional jump-off point configuration adaptation module is added to the computing agent module. The module is configured to be invoked, when a computing code module performs a live migration operation, to separately configure jump-off point information for a source physical machine and a destination physical machine used in migration. The configuration information mainly includes an IP address of an encapsulated packet of the source physical machine, an IP address of an encapsulated packet of the destination physical machine, virtual machine port information (including an identifier of a virtual machine, for example, port information that is of a virtual network interface card of the virtual machine on a physical machine on which the virtual machine is located and that corresponds to a virtual switch), and the like.

The virtual network agent module 202 is a module configured to manage all network configurations of a virtual machine on a physical machine (computing node), including layer-2 switching, layer-3 routing, load balancing, a firewall, and a virtual private network (VPN). In this application, a preconfiguration function module is added to the virtual network agent module. After a preconfiguration API is invoked, the module is configured to deliver a configuration when a virtual network management and control module instructs a corresponding virtual network agent module (such as a layer 2 (L2)\layer 3 (L3)\Dynamic Host Configuration Protocol (DHCP) agent). In this application, a unidirectional jump-off point function module is added to the virtual network agent module. After the virtual machine is migrated, the module is configured to be invoked to guide traffic of the source physical machine to the destination physical machine.

The computing virtualization module 203 is configured to manage a lifecycle of a virtual machine at a virtualization layer and be responsible for a virtual device management layer, including creating, starting, and shutting down a virtual machine, and the like, and may be interconnected to different Hypervisors and an upper-layer cloud computing framework platform.

The network virtualization module 204 is a platform configured to provide a basic network communication capability and an advanced network feature for a virtual machine, and provide a standard function interface for the upper layer. In this application, a bidirectional jump-off point function module is added to the network virtualization module. After a virtual machine is live migrated, an enabling interface of the module is invoked by the computing virtualization module. Incoming and outgoing traffic of the to-be-migrated virtual machine is forwarded using a bidirectional jump-off point.

It should be noted that, the jump-off point mentioned in this application may be understood as having a data forwarding function. The bidirectional jump-off point means that uplink data sent by a third-party physical machine to the source physical machine needs to be forwarded, and downlink data sent by the destination physical machine to a virtual machine on the third-party physical machine also needs to be forwarded. The unidirectional jump-off point means that only uplink data sent by the third-party physical machine to the source physical machine needs to be forwarded.

It may be understood that the structure of the control node physical machine and the computing node physical machine shown in FIG. 4 is merely an example implementation of this embodiment of the present disclosure. The structure of the control node physical machine and the computing node physical machine in this embodiment of the present disclosure includes but is not limited to the foregoing structure.

Based on the server architecture shown in FIG. 3 and the structure of the control node physical machine and the computing node physical machine shown in FIG. 4, with reference to a data processing method provided in this application, the technical problem mentioned in this application is analyzed and resolved.

Figure 5:
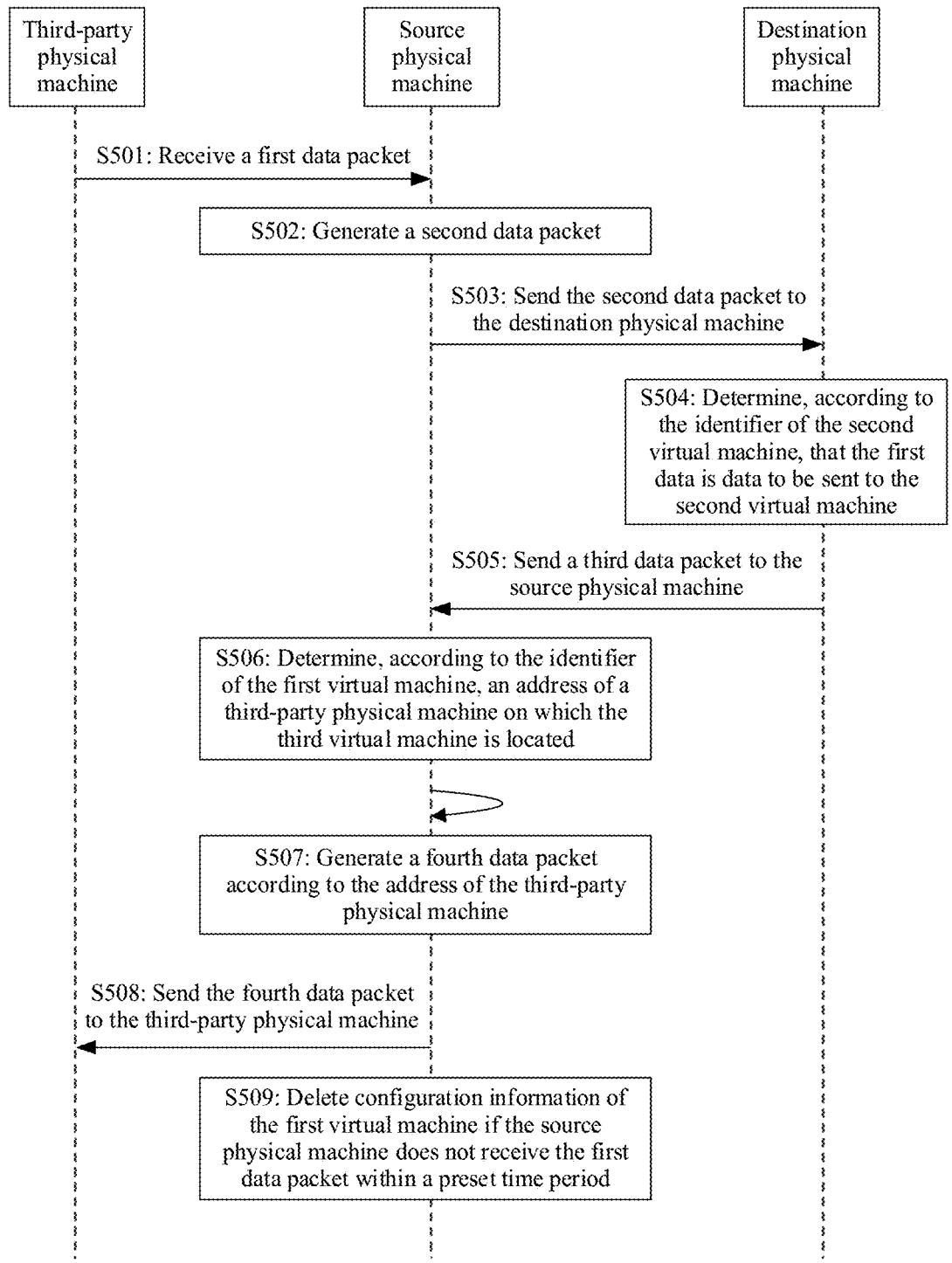
FIG. 5 is a schematic flowchart of a data processing method according to an embodiment of the present disclosure.

Refer to FIG. 5. FIG. 5 is a schematic flowchart of a data processing method according to an embodiment of the present disclosure. The method may be applied to the server architecture in FIG. 3. The physical machine 20 may be configured to support and perform steps S501 to S504 in a method procedure shown in FIG. 5. The following describes interaction between a source physical machine and a destination physical machine with reference to FIG. 3. The method may include the following steps S501 to S504, and optionally may further include steps S505 to S508.

Step S501: The source physical machine receives a first data packet, where the first data packet includes first data, and a destination address of the first data is a first virtual machine.

Step S502: The source physical machine generates a second data packet, where the second data packet includes the first data and an identifier of a second virtual machine, the first virtual machine is the second virtual machine after being live migrated from the source physical machine to the destination physical machine, and the identifier of the second virtual machine is used to identify the second virtual machine on the destination physical machine.

Step S503: The source physical machine sends the second data packet to the destination physical machine, and the destination physical machine receives the second data packet sent by the source physical machine.

Step S504: The destination physical machine determines, according to the identifier of the second virtual machine, that the first data is data to be sent to the second virtual machine.

It should be noted that the source physical machine and the destination physical machine are substantially the same in this embodiment of the present disclosure, and may be devices such as a computer, a physical server, and a physical node. For ease of description, a physical machine on which a virtual machine is located before migration is referred to as the source physical machine, and a physical machine on which a virtual machine is located after migration is referred to as the destination physical machine. Similarly, for ease of description, a virtual machine before migration on the source physical machine is referred to as a first virtual machine, and a virtual machine after migration on the destination physical machine is referred to as a second virtual machine. Details are not described again.

Further, in this embodiment corresponding to the steps S501 to S504, the first virtual machine on the source physical machine is the second virtual machine after being live migrated to the destination physical machine. The first data packet received by the source physical machine may be sent by a third-party physical machine (which may be the source physical machine, the destination physical machine, or another physical machine). A destination address of an outer packet of the first data packet is the source physical machine, and a destination address of an inner packet (the first data) is the first virtual machine. Therefore, after receiving the first data packet, the source physical machine identifies, according to undeleted configuration information related to the first virtual machine, that the first data packet is sent to the migrated first virtual machine, and re-encapsulates the first data, to be specific, updates an outer physical destination address of the first data to the destination physical machine, and updates an outer physical source address to the source physical machine address. The source physical machine forwards the first data to the destination physical machine on which the second virtual machine after migration is located such that the second virtual machine can receive the first data for processing. This can avoid a packet loss when the first data cannot be correctly received and processed because there is no first virtual machine on the source physical machine. Optionally, the third-party physical machine is a physical machine on which a virtual machine having an interaction relationship with the first virtual machine is located. Optionally, the configuration information of the first virtual machine may include a CPU configuration, a graphics card configuration, a network configuration, a storage configuration, and the like.

In a possible implementation, network configuration information of the second virtual machine is not configured on the destination physical machine. The network configuration information may include a flow rule for layer-2 communication, route configuration for layer-3 communication, a flow rule configuration, NAT configuration information for EIP communication, and the like. Optionally, the network configuration information includes a network configuration of layer-2 communication, layer-3 communication, and EIP communication for sending and receiving data by the second virtual machine. The second virtual machine cannot identify the second data packet received by the destination physical machine. Therefore, in this embodiment of the present disclosure, the identifier of the second virtual machine is added to the second data packet such that the destination physical machine can identify, according to the identifier, that the second data is to be received by the second virtual machine, and correctly identify that the first data is the data to be sent to the second virtual machine. Optionally, the identifier of the second virtual machine may be a virtual network interface card identifier of the second virtual machine, a name that uniquely identifies the second virtual machine on the destination physical machine, or the like. It may be understood that, after the first virtual machine is migrated from the source physical machine to the destination physical machine and becomes the second virtual machine, a virtual network interface card identifier or a name of the first virtual machine usually remains unchanged. Therefore, the identifier of the second virtual machine added by the source physical machine in a process of encapsulating the second data packet may be actually understood as an identifier of the first virtual machine on the source physical machine.

The network configuration information (that is, a general network preconfiguration described below) is used to ensure that network interruption is not caused by an uncompleted network configuration on the destination physical machine after migration. This can reduce network interruption and can also greatly reduce live migration duration, and is irrelevant to a virtual private cloud (VPC) scale. For example, a plurality of VMs of a customer may communicate with each other through layer-2 communication, layer-3 communication, or EIP communication. For a direction in which a virtual machine receives data, a network configuration for receiving the data is fixed, as long as a destination physical machine has a fixed related network configuration for receiving the data. However, for a direction in which a virtual machine sends data, different network configurations are required for communication with different virtual machines. A plurality of pieces of configuration information of the plurality of VMs may need to be added to the network configuration for sending data. For example, if 100 configurations are required for communication with 10 VMs, 1000 configurations are required for communication with 100 VMs. More configurations are delivered to more virtual machines on a VPC. In the case of the general preconfiguration and a bidirectional jump-off point, operations can be concurrently performed without completing the network preconfiguration. Therefore, interruption time is not affected by a VPC scale (a larger VPC scale leads to longer interruption time in other approaches solution). However, entire migration duration is related to network preconfiguration completion time.

For example, as shown in FIG. 6, FIG. 6 is a schematic diagram of a packet encapsulation format of the first data packet and the second data packet according to this embodiment of the present disclosure. Both the first data packet and the second data packet include an outer packet and an inner packet.

1. A packet sent by a third virtual machine that is on the third-party physical machine and that has an interaction relationship with the first virtual machine is an inner packet, that is, the first data. If it is learned, using a local flow rule table of the third-party physical machine, that the first virtual machine that needs to communicate is located on the source physical machine, the packet needs to be encapsulated into a standard VXLAN packet, that is, the first data packet (shown in FIG. 1), and sent by a physical network interface card of the third-layer physical machine. It is ensured that the first data packet is physically sent to the source physical machine. Optionally, in an actual application process, the data packet may be further encapsulated in a User Datagram Protocol (UDP) packet during encapsulation. It should be noted that the third virtual machine and a third virtual machine in a subsequent step S505 may be a same virtual machine or different virtual machines, and the third-party physical machine and a third-party physical machine in a subsequent step may be a same physical machine or different physical machines. That is, it may be considered that the third-party virtual machine on the third-party physical machine is a type of virtual machine that has an interaction relationship with the first virtual machine, but not a particular virtual machine. This is not limited in this application.

2. After receiving the packet, the source physical machine first decapsulates the packet and determines that the packet is from the first virtual machine (based on a VNI and a MAC address) that has been migrated. In this case, a new jump-off point module (a function is enabled for the first virtual machine after the first virtual machine is migrated) of a virtual switch re-encapsulates the inner packet (shown in FIG. 2), to be specific, adds the identifier of the second virtual machine, and sends the packet to the destination physical machine on which a virtual machine after migration is located. This can avoid discarding of the data packet sent to the first virtual machine in the virtual machine migration process, and improve data processing reliability.

3. After the destination physical machine receives the encapsulated packet, a jump-off point module determines whether the packet is encapsulated by the jump-off point module. If the packet is encapsulated by the jump-off point module, the jump-off point module decapsulates the packet and obtains the identifier of the second virtual machine, for example, the virtual network interface card identifier of the second virtual machine. The jump-off point module finds a corresponding virtual network interface card device according to the identifier, and sends the inner packet, that is, the first data, to the second virtual machine using the virtual network interface card device. Optionally, a VXLAN header of the packet may carry a special VNI, for example, a VNI1, to indicate that the data packet is uplink jump-off point traffic.

In this embodiment of the present disclosure, in the time period 2 in the first case shown in FIG. 1 and in (the time period 1'+the time period 2') in the second case, when a network configuration of a virtual machine after migration is not updated on the destination physical machine in a timely manner, or when configuration information for communicating with the virtual machine after migration is not updated on another virtual machine of a same tenant in a timely manner after the virtual machine is migrated, and a virtual machine on a third-party physical machine does not store an address of the destination physical machine on which the to-be-migrated virtual machine is located, a packet of uplink first data sent to the first virtual machine on the source physical machine may be lost. This embodiment of the present disclosure resolves the packet loss. This can avoid network interruption and improve user experience.

Optionally, before or after the steps S501 to S504 are performed, the method may further include the following steps S505 to S508.

Step S505: The destination physical machine sends a third data packet to the source physical machine, where the third data packet includes second data and an identifier of the first virtual machine, the identifier of the first virtual machine is used to identify the first virtual machine on the source physical machine, and a destination address of the second data is a third virtual machine, and the source physical machine receives the third data packet sent by the destination physical machine.

Step S506: The source physical machine determines, according to the identifier of the first virtual machine, an address of a third-party physical machine on which the third virtual machine is located.

Step S507: The source physical machine generates a fourth data packet according to the address of the third-party physical machine, where the fourth data packet includes the second data.

Step S508: The source physical machine sends the fourth data packet to the third-party physical machine.

Step S509: The source physical machine deletes configuration information of the first virtual machine if the source physical machine does not receive the first data packet within a preset time period.

Further, in this embodiment corresponding to the steps S505 to S509, if the destination physical machine needs to feed back the second data after receiving, using the source physical machine, the first data sent by the third-party virtual machine, or the destination physical machine needs to actively send the second data to the third-party virtual machine, the destination physical machine has learned an address of the third-party virtual machine. Optionally, if the network configuration information of the second virtual machine is not configured on the destination physical machine, and the network configuration information further includes physical address information of different virtual machines of the same tenant, the destination physical machine cannot learn a physical address of the third-party virtual machine. However, in this embodiment of the present disclosure, the address information is stored on the source physical machine. Therefore, the destination physical machine sends, to the source physical machine using a jump-off point, the third data packet that needs to be sent to the third virtual machine on the third-party physical machine. After receiving the data packet, the source physical machine first internally decapsulates the packet, determines the first virtual machine according to the identifier of the first virtual machine, determines a virtual network interface card device (a network port) corresponding to the first virtual machine, simulates receiving of the third data packet using the virtual network interface card device, and parses out, according to a destination MAC address and a destination IP address in an inner packet of the third data packet, that the data packet is further sent to the third virtual machine. Therefore, the source physical machine obtains, according to undeleted configuration information such as a flow table (the configuration information includes an address of a physical machine on which the third-party virtual machine is located), the address of the physical machine corresponding to the MAC address of the third-party virtual machine, re-encapsulates the data packet into a data packet whose destination address is the address of the physical machine on which the third-party virtual machine is located, and sends the data packet to the third-party physical machine. Optionally, the source physical machine may alternatively determine the third data packet as a jump-off point packet according to the special VNI carried in the VXLAN, and further finds a corresponding virtual machine network interface card according to the identifier of the first virtual machine.

In a possible implementation, a source address of the first data is the third virtual machine, the destination address of the second data is the third virtual machine, and the second data is data in response to the first data or the first data is data in response to the second data. That is, the third-party virtual machine on the third-party physical machine needs to send data to the first virtual machine on the source physical machine. However, the first virtual machine has been migrated to the destination physical machine at this time and becomes the second virtual machine after migration. After the first data is forwarded using the jump-off point on the source physical machine in this application, the first data is forwarded to the destination physical machine using the source physical machine. If the second virtual machine on the destination physical machine needs to respond to the first data with the second data, the destination physical machine also forwards, using the source physical machine, the second data to the third-party physical machine in a form of the third data packet. It may be understood that, after related migration information of the first virtual machine has been updated for the third virtual machine on the third-party physical machine, if the third virtual machine directly sends the first data to the destination physical machine, the destination physical machine may directly send the second data in response to the first data to the third-party physical machine. This can ensure symmetry of uplink and downlink data between the third-party physical machine and the destination physical machine, and avoid data loss or packet loss.

In a possible implementation, the source physical machine deletes the configuration information of the first virtual machine if the source physical machine does not receive the first data packet within a preset time period. Optionally, after network configuration of the second virtual machine is completed on the destination physical machine, the configuration information of the first virtual machine may also be deleted.

For example, as shown in FIG. 7, FIG. 7 is a schematic diagram of a packet encapsulation format of the third data packet and the fourth data packet according to this embodiment of the present disclosure.

1. A packet sent by the second virtual machine on the destination physical machine is an inner packet, that is, the second data. A virtual switch jump-off point module on the destination physical machine is enabled to directly encapsulate the inner packet into a jump-off point packet, that is, the third data packet, and send the packet to the source physical machine (shown in FIG. 3). Optionally, a VXLAN header of the packet may carry a special VNI, for example, a VNI2, to indicate that the data packet is downlink jump-off point traffic.

2. After the source physical machine receives the encapsulated packet, a jump-off point module determines whether the packet is encapsulated by the jump-off point module. If the packet is encapsulated by the jump-off point module, the jump-off point module decapsulates the packet and obtains the identifier of the first virtual machine, for example, the virtual network interface card identifier of the first virtual machine. The jump-off point module finds a corresponding virtual network interface card device according to the identifier, simulates a forwarding procedure after the virtual network interface card device receives the data packet, determines, according to the inner packet, that a virtual machine that needs to communicate is the third virtual machine, determines, according to undeleted configuration information, an address of the third-party physical machine on which the third virtual machine is located, encapsulates the data packet into a standard VXLAN packet, and sends the standard VXLAN packet to the third-party physical machine.

3. The third-party physical machine receives the standard packet, normally decapsulates the packet, and sends the packet to the third virtual machine.

In this embodiment of the present disclosure, in the time period 1 in the first case shown in FIG. 1 and in the time period 1' in the second case, when a network configuration of a virtual machine after migration is not updated on the destination physical machine in a timely manner after the virtual machine is migrated, or when the second virtual machine needs to communicate with the third virtual machine on the third-party physical machine, but does not store the address of the third-party physical machine on which the third virtual machine is located, a packet of downlink data may be lost. This embodiment of the present disclosure resolves the packet loss.

With reference to the structure of the physical machine 10 and the physical machine 20 provided in this embodiment of the present disclosure, and based on the foregoing method procedure executed by the physical machine 20, the following provides an implementation applicable to a live migration scenario to avoid network interruption. The implementation includes the following steps.

(1) Preconfigure the network configuration of the virtual machine on the destination physical machine during live migration.

Figure 8:
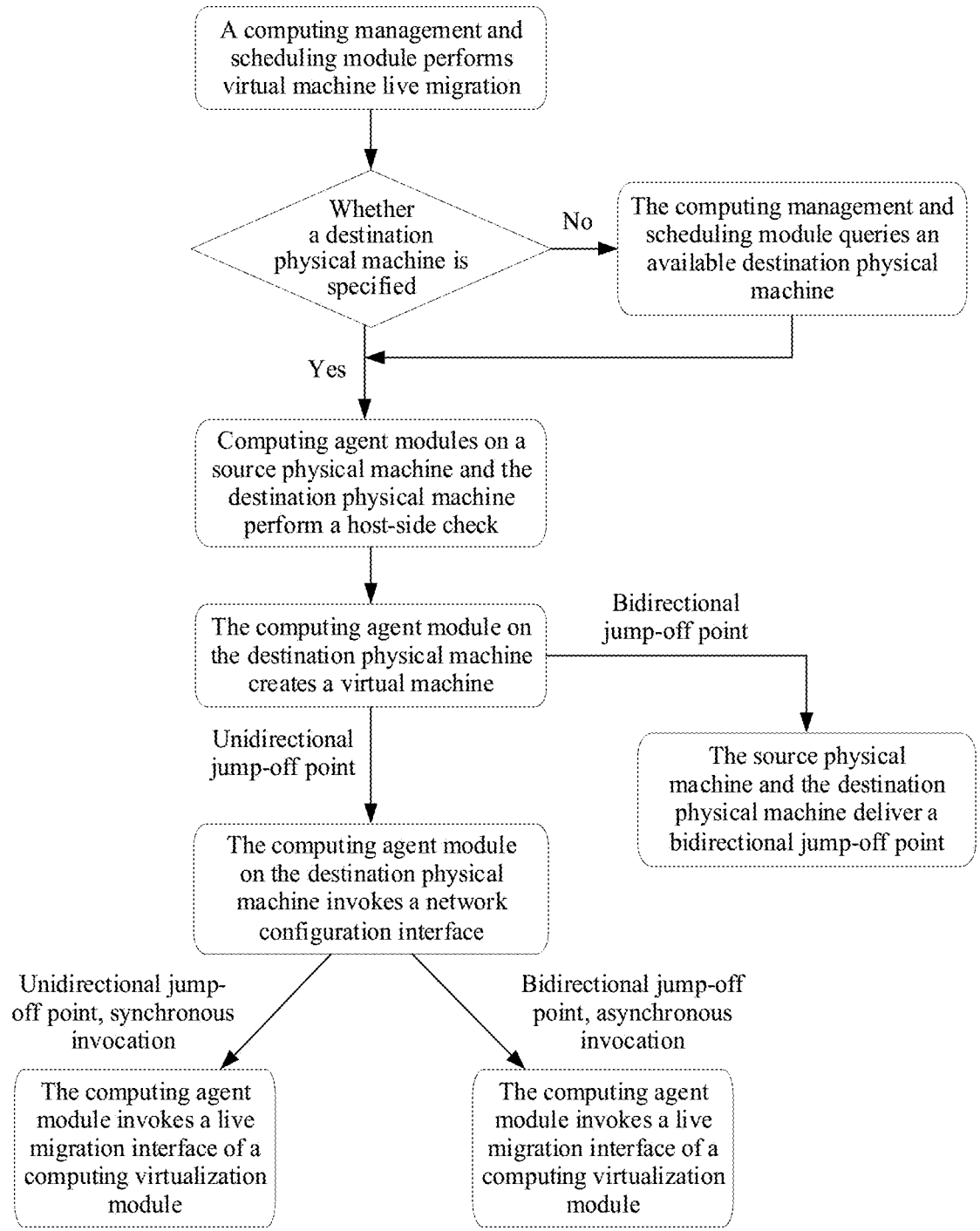
FIG. 8 is a schematic flowchart of network preconfiguration according to an embodiment of the present disclosure.

As shown in FIG. 8, FIG. 8 is a schematic flowchart of network preconfiguration according to this embodiment of the present disclosure.

First, the computing management and scheduling module 101 invokes a preconfiguration interface before notifying a source physical node of migration. The computing management and scheduling module 101 initiates a virtual machine live migration task. The computing management and scheduling module 101 determines whether a destination physical machine is specified. If the destination physical machine is specified, the computing management and scheduling module 101 directly instructs, using a remote procedure call (RPC) message, the computing agent module 201 on the source physical machine to perform a live migration operation. If the destination physical machine is not specified, the computing management and scheduling module 101 selects an available destination physical machine, and instructs, using an RPC message, the computing agent module 201 on the source physical machine to perform a live migration operation.

Then, the computing agent module 201 on the source physical machine and that on the destination physical machine perform a host-side check. After the check succeeds, the computing agent module 201 on the destination physical machine creates a network device required by a virtual machine.

Finally, if a unidirectional jump-off point is used, the computing agent module 201 first invokes the preconfiguration interface, and invokes a migration interface of the computing virtualization module 203 after the preconfiguration interface returns a success. If a bidirectional jump-off point is used, the computing agent module 201 on the source physical machine and that on the destination physical machine need to first configure information for the jump-off point, and invoke the preconfiguration interface and the migration interface of the computing virtualization module 203.

(2) Enable a network jump-off point for live migration.

Figure 9:
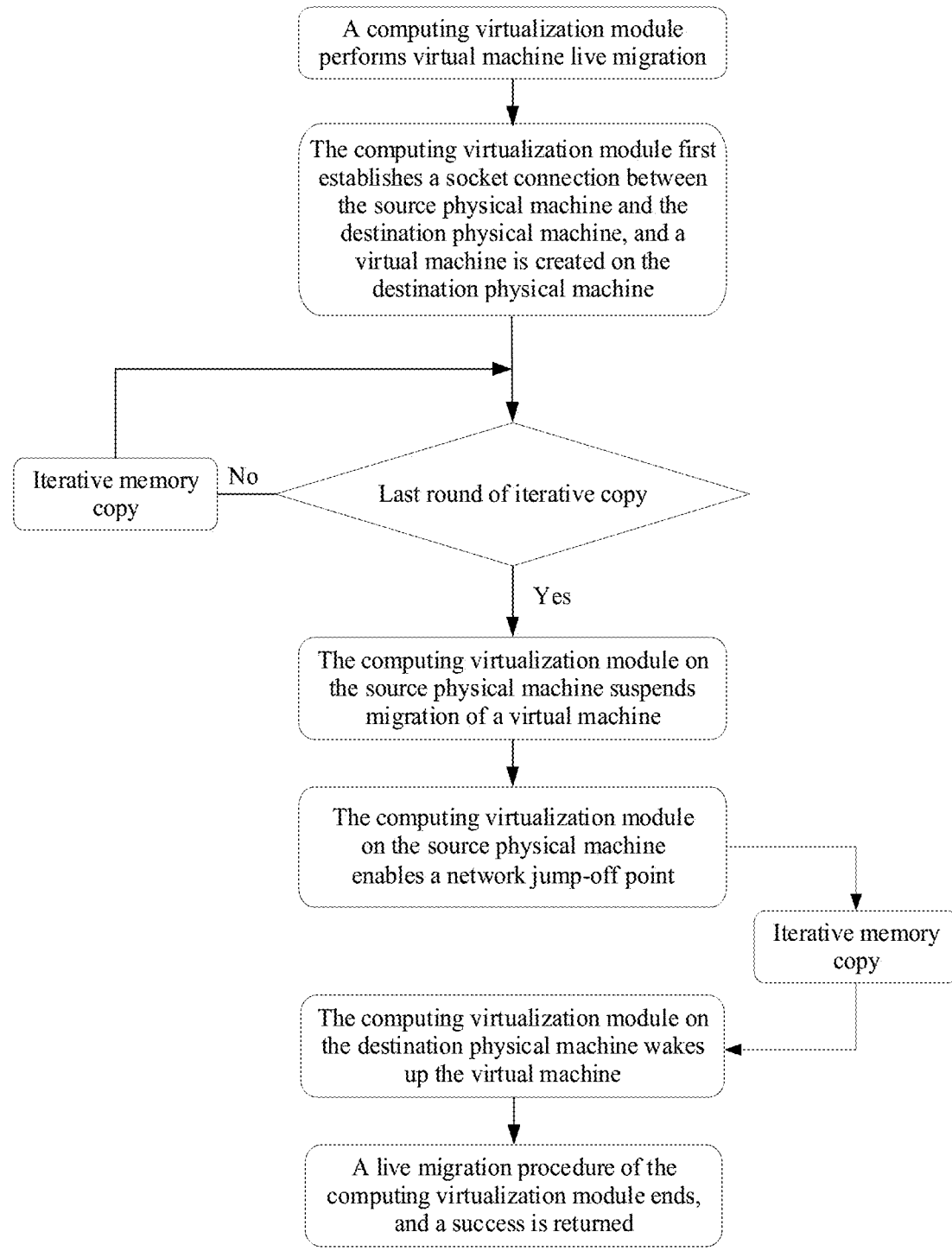
FIG. 9 is a schematic flowchart of enabling a network jump-off point according to an embodiment of the present disclosure.

As shown in FIG. 9, FIG. 9 is a schematic flowchart of enabling a network jump-off point according to this embodiment of the present disclosure. This step is performed after the step (1) is completed and after the first virtual machine on the source physical machine is suspended in the live migration procedure of the computing virtualization module 203.

The computing virtualization module 203 first establishes a socket connection between the source physical machine and the destination physical machine during live migration.

Then, an initialized virtual machine on the destination physical machine is in a suspended state. The source physical machine copies a memory of the to-be-migrated virtual machine to the destination physical machine.

Before the last round of iterative memory copy, suspend the virtual machine and enable the network jump-off point for live migration. After the last round of iterative memory copy is completed, wake up the virtual machine on the destination physical machine.

(3) Forward the network jump-off point for live migration.

Figure 10:
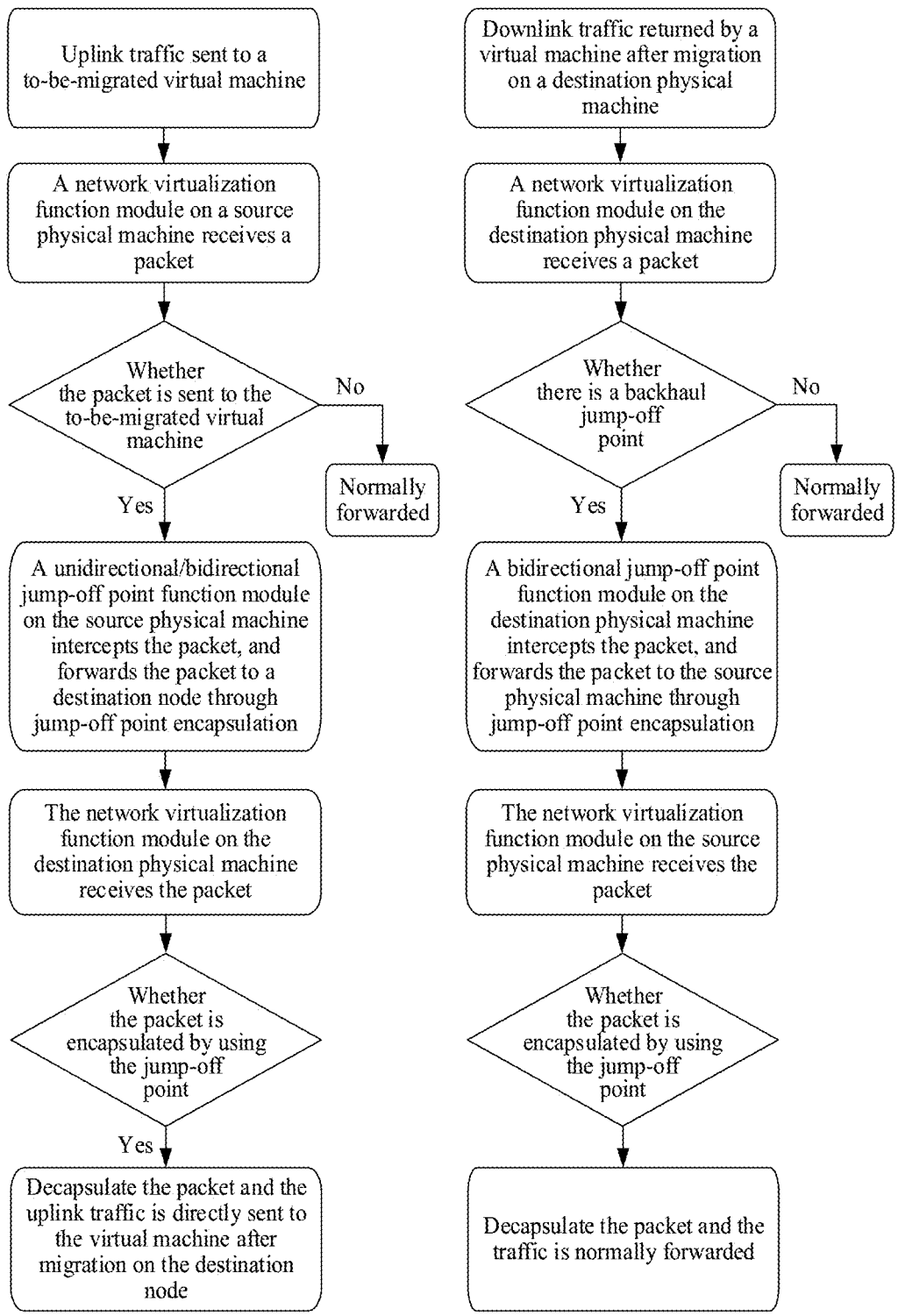
FIG. 10 is a schematic flowchart of a normal working procedure of a jump-off point according to an embodiment of the present disclosure.

As shown in FIG. 10, FIG. 10 is a schematic flowchart of a normal working procedure of a jump-off point according to this embodiment of the present disclosure. This step is automatically performed after the steps (1) and (2) are completed.

If uplink traffic (for example, the first data packet) needs to be guided to the source physical machine, the jump-off point function module added to the network virtualization module 204 actively intercepts the traffic, and guides the traffic to the second virtual machine on the destination physical machine through jump-off point encapsulation.

If downlink traffic (for example, the third data packet) is responded by the second virtual machine, the traffic is guided to the source physical machine using a backhaul jump-off point, and is normally forwarded by the source physical machine back to the third-party physical machine. There is a path for the bidirectional jump-off point.

If there is no return jump-off point, the traffic is forwarded by the destination physical machine. There is a path for the unidirectional jump-off point.

(4) Disable the network jump-off point for live migration.

Figure 11:
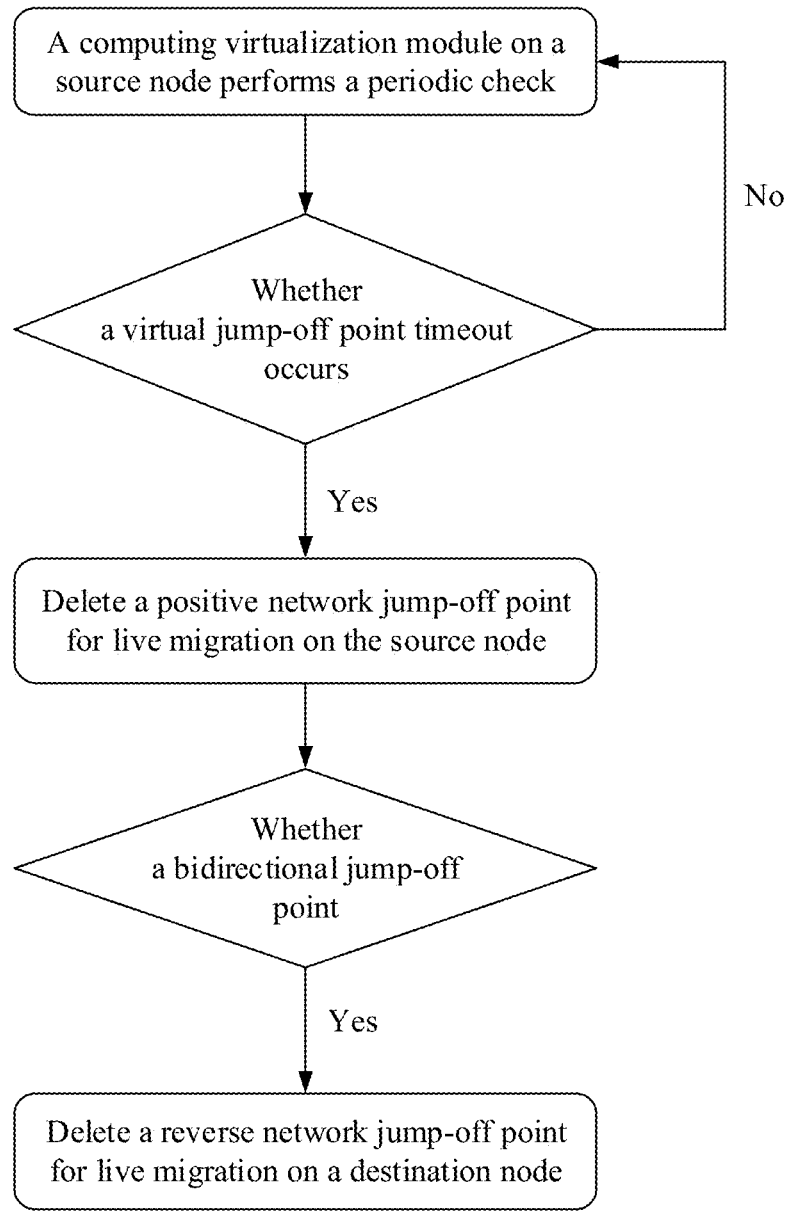
FIG. 11 is a schematic flowchart of disabling a jump-off point according to an embodiment of the present disclosure.

As shown in FIG. 11, FIG. 11 is a schematic flowchart of disabling a jump-off point according to this embodiment of the present disclosure. This step is performed after the steps (1) and (2) are completed.

The computing virtualization module on the source physical machine periodically checks whether the jump-off point is not used before a timeout. If a timeout occurs, the computing virtualization module deletes the network jump-off point for live migration on the source physical machine and instructs the destination physical machine to delete a reverse network jump-off point for live migration. If a timeout does not occur, the computing virtualization module continues to perform a next cycle. Perform this step only when the source physical machine does not have the uplink traffic of the to-be-migrated virtual machine or the jump-off point timeout occurs.

The following provides a specific implementation of applying the data processing method in this application to a HUAWEI public cloud OpenStack platform, and configuring the newly added function modules in this application in software corresponding to the platform. This implementation is applicable to a LINUX kernel version upgrade scenario. A LINUX kernel version cannot be upgraded using a hot patch. Therefore, the LINUX kernel version is upgraded only after a virtual machine on a physical server whose version needs to be upgraded is live migrated to another physical server. Then, the virtual machine is migrated back. A specific implementation is as follows.

1. On an upgrade tool screen, select a source host to be upgraded and start host migration. To be specific, invoke a host migration interface provided by an OpenStack nova-api. The host migration interface verifies all virtual machine instances on the specified host, updates a status to migrating, and transfers a live migration task to a nova-conductor. The nova-api is a service that is running on a control node and is specially used to process a representational state transfer (REST) API request. The nova-conductor is a process introduced to securely access a nova database.

2. The nova-conductor creates the live migration task based on input information and performs the task. When performing the task, the nova-conductor verifies a status of a to-be-migrated virtual machine and a status of the source host. Then, the nova-conductor invokes a nova-scheduler to select an available destination host and instructs, using an RPC, a nova-compute service on a source physical machine to perform a migration operation. The nova-scheduler is a process provided by nova for scheduling instance lifecycle resources.

3. The nova-compute service on the source physical machine receives an RPC live migration request and checks the source and destination hosts before live migration. Then, the nova-compute service creates a virtual port (NIC) and a disk for a virtual machine after migration on the destination physical machine, and invokes a preconfiguration interface provided by a neutron-api to deliver all network configurations of layer 2 communication, layer 3 communication, EIP communication, and network security for the NIC of a virtual machine. If a unidirectional jump-off point is used, after the preconfiguration interface returns a success, invoke a computing virtualization layer live migration interface provided by libvirt to perform the live migration operation. If a bidirectional jump-off point is used, the preconfiguration interface does not need to return a success, nova-compute services on a source physical machine and a destination physical machine invoke more than 100,000 bidirectional jump-off point configuration interfaces provided at a network virtualization layer, to separately configure jump-off point configuration information for the bidirectional jump-off point for NICs of a to-be-migrated virtual machine on the source physical machine and a virtual machine after migration on the destination physical machine, where the information includes key information for encapsulation of the jump-off point, such as a source IP address, a destination IP address, and a NIC name, and invokes the computing virtualization layer live migration interface provided by libvirt to perform the live migration operation.

Figure 12:
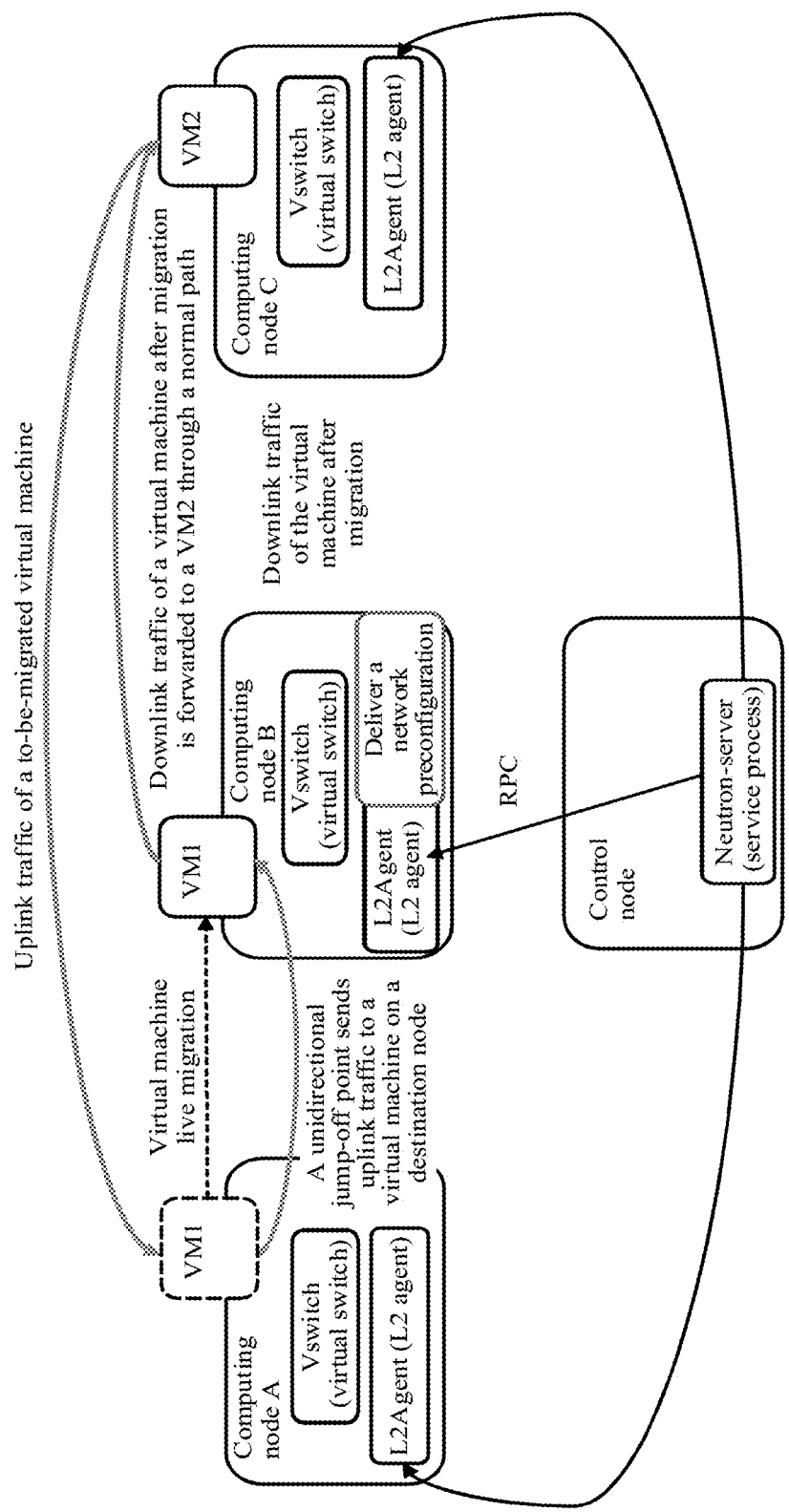
FIG. 12 is a schematic diagram of a unidirectional jump-off point data model according to an embodiment of the present disclosure.
Figure 13:
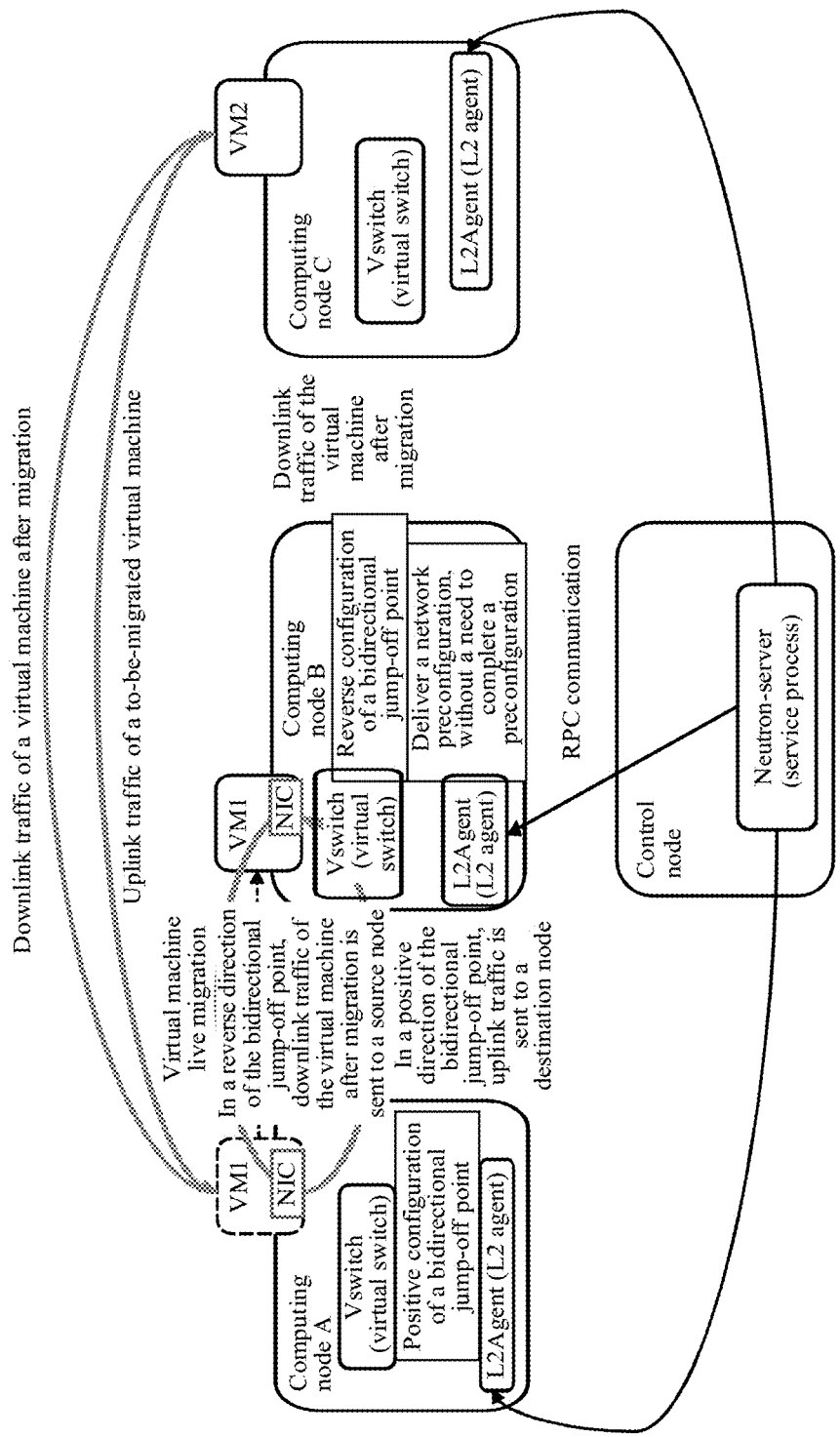
FIG. 13 is a schematic diagram of a bidirectional jump-off point data model according to an embodiment of the present disclosure.

4. A libvirt process on the source physical machine first establishes a socket connection to the destination physical machine, the source physical machine sends a virtual machine xml to the destination physical machine, the destination physical machine creates a virtual machine in a suspended state, and the source physical machine sends an inner layer of the virtual machine to the destination physical machine by iterative copying. Before a last round of iteration, the virtual machine is suspended (SUSPEND) on the source physical machine and a jump-off point is enabled on the source physical machine. The source physical machine sends a last round of memory to the destination physical machine and wakes up (RESUME) the virtual machine on the destination physical machine. In this case, MAC address entries of virtual and physical switches need to be updated, and a neutron-server sends an RPC message to all computing node to update information about the host on which a virtual machine after migration is located. A computing node L2 agent receives and processes the message. In this case, the virtual machine after migration uses a unidirectional jump-off point traffic model. As shown in FIG. 12, FIG. 12 is a schematic diagram of a unidirectional jump-off point data model according to this embodiment of the present disclosure. As shown in FIG. 13, FIG. 13 is a schematic diagram of a bidirectional jump-off point data model according to this embodiment of the present disclosure.

5. A libvirt interface returns a migration success to the nova-compute service on the source physical machine. The nova-compute service on the destination physical machine updates information about the host on which the virtual machine is located. The nova-compute service on the source physical machine starts to destroy the virtual machine in the suspended state on the source physical machine. Migration is completed. A network virtualization component cyclically checks whether traffic passes through the jump-off point on the source physical machine. If no traffic passes through the jump-off point within a specified period, all network traffic is forwarded and the jump-off point can be deleted.

In this embodiment of the present disclosure, operations such as preconfiguring a network configuration, configuring a network jump-off point, enabling a jump-off point, network jump-off point function module, and disabling the jump-off point are added to an existing live migration process such that data traffic of a to-be-migrated virtual machine is guided, according to an expected path, to a virtual machine after migration on a destination physical machine. This can effectively ensure continuous communication of various types of traffic in the migration process, and can ensure that network interruption duration during live migration is less than 1 second or shorter, to maintain stable service running.

The foregoing describes in detail the method in the embodiments of the present disclosure, and the following provides a related apparatus in embodiments of the present disclosure.

Figure 14:
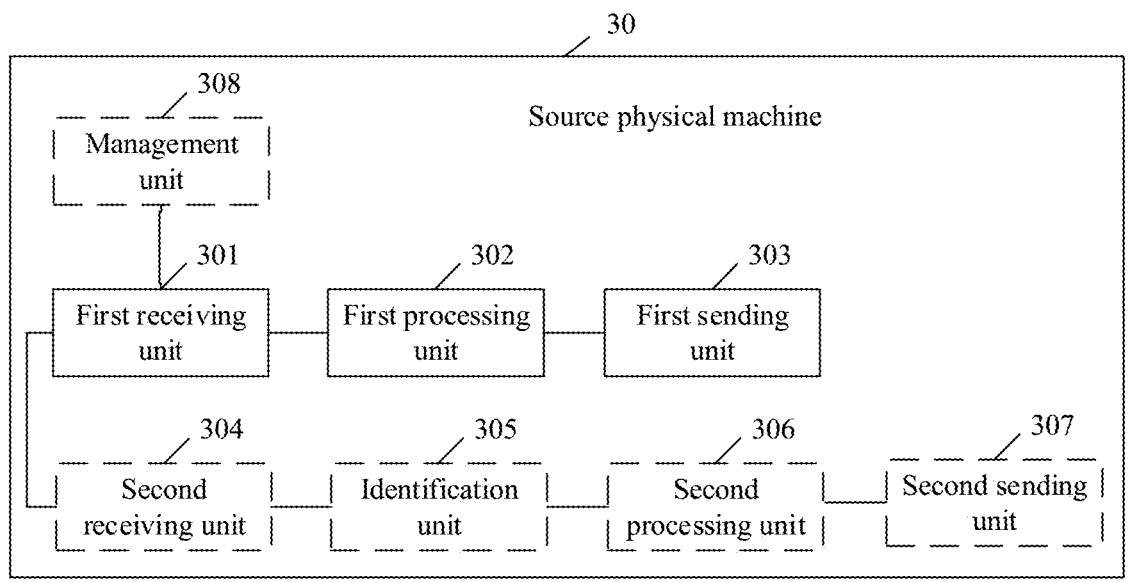
FIG. 14 is a schematic diagram of a structure of a physical machine according to an embodiment of the present disclosure.

Refer to FIG. 14. FIG. 14 is a schematic diagram of a structure of a physical machine according to an embodiment of the present disclosure. The physical machine is a source physical machine. The source physical machine 30 may include a first receiving unit 301, a first processing unit 302, and a first sending unit 303. The units are described in detail as follows.

The first receiving unit 301 is configured to receive a first data packet, where the first data packet includes first data, and a destination address of the first data is a first virtual machine.

The first processing unit 302 is configured to generate a second data packet, where the second data packet includes the first data and an identifier of a second virtual machine, the second virtual machine is the first virtual machine after being live migrated from the source physical machine to a destination physical machine, and the identifier of the second virtual machine is used to identify the second virtual machine on the destination physical machine.

The first sending unit 303 is configured to send the second data packet to the destination physical machine.

In a possible implementation, the physical machine further includes a second receiving unit 304 configured to receive a third data packet sent by the destination physical machine, where the third data packet includes second data and an identifier of the first virtual machine, the identifier of the first virtual machine is used to identify the first virtual machine on the source physical machine, and a destination address of the second data is a third virtual machine, an identification unit 305 configured to determine, according to the identifier of the first virtual machine, an address of a third-party physical machine on which the third virtual machine is located, a second processing unit 306 configured to generate a fourth data packet according to the address of the third-party physical machine, where the fourth data packet includes the second data, and a second sending unit 307 configured to send the fourth data packet to the third-party physical machine.

In a possible implementation, the third virtual machine is a virtual machine that has an interaction relationship with the first virtual machine, and the identification unit is further configured to obtain, according to the identifier of the first virtual machine, configuration information of the first virtual machine, where the configuration information includes the address of the third-party physical machine on which the third virtual machine is located, and search for and determine, according to the configuration information, the address of the third-party physical machine on which the third virtual machine is located.

In a possible implementation, the physical machine further includes a management unit 308 configured to delete the configuration information of the first virtual machine if the first data packet is not received within a preset time period.

In a possible implementation manner, migration information of the first virtual machine is not updated on the third virtual machine, where the migration information includes an address of the destination physical machine on which the second virtual machine is located.

It should be noted that, for a function of each functional unit of the source physical machine 30 described in this embodiment of the present disclosure, reference may be made to related descriptions of the steps S501 to S509 in the method embodiment shown in FIG. 5. Details are not described herein again.

Figure 15:
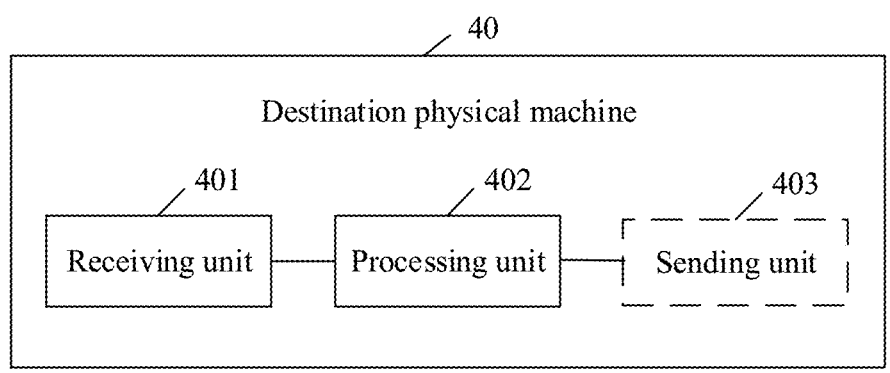
FIG. 15 is a schematic diagram of another structure of a physical machine according to an embodiment of the present disclosure.

Refer to FIG. 15. FIG. 15 is a schematic diagram of another structure of a physical machine according to an embodiment of the present disclosure. The physical machine is a destination physical machine. The destination physical machine 40 may include a receiving unit 401 and a processing unit 402. The units are described in detail as follows.

The receiving unit 401 is configured to receive a second data packet sent by a source physical machine, where the second data packet is generated by the source physical machine according to a received first data packet, the first data packet includes first data, a destination address of the first data is a first virtual machine, the second data packet includes the first data and an identifier of a second virtual machine, the first virtual machine is the second virtual machine after being live migrated from the source physical machine to the destination physical machine, and the identifier of the second virtual machine is used to identify the second virtual machine on the destination physical machine.

The processing unit 402 is configured to determine, according to the identifier of the second virtual machine, that the first data is data to be sent to the second virtual machine.

In a possible implementation, the physical machine further includes a sending unit 403 configured to send a third data packet to the source physical machine, where the third data packet includes second data and an identifier of the first virtual machine, a destination address of the second data is a third virtual machine, and the identifier of the first virtual machine is used to identify the first virtual machine on the source physical machine.

In a possible implementation, network configuration information of the second virtual machine is not currently completed on the destination physical machine, and the network configuration information includes at least one of a configuration rule of layer-2 communication, a configuration rule of layer-3 communication, and a configuration rule of EIP communication.

It should be noted that, for a function of each functional unit of the destination physical machine 40 described in this embodiment of the present disclosure, reference may be made to related descriptions of the steps S501 to S509 in the method embodiment shown in FIG. 5. Details are not described herein again.

Figure 16:
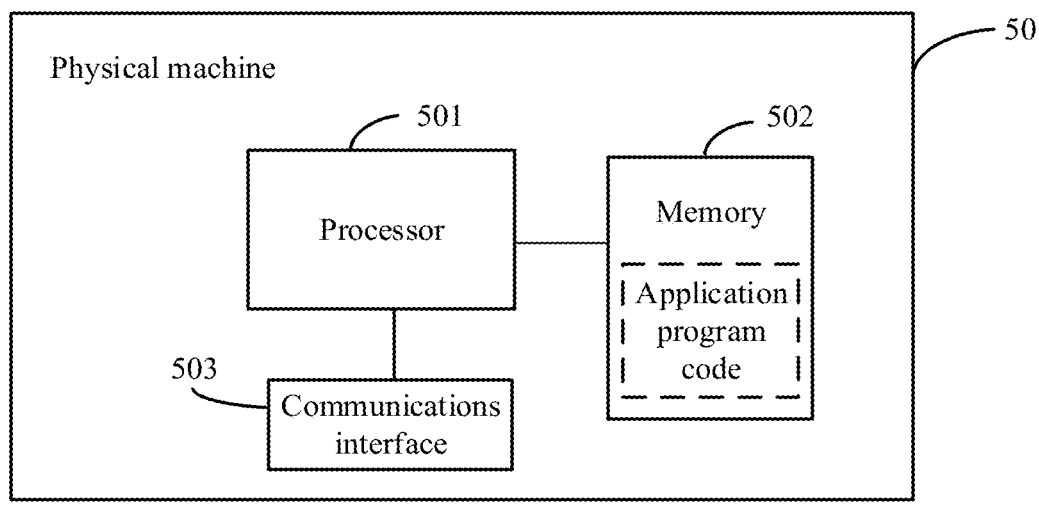
FIG. 16 is a schematic diagram of still another structure of a physical machine according to an embodiment of the present disclosure.

As shown in FIG. 16, FIG. 16 is a schematic diagram of still another structure of a physical machine according to an embodiment of the present disclosure. The physical machine 50 includes at least one processor 501, at least one memory 502, and at least one communications interface 503. In addition, the device may further include general-purpose components such as an antenna, and details are not described herein.

The processor 501 may be a CPU, a microprocessor, an application-specific integrated circuit (ASIC), or one or more integrated circuits for controlling execution of the foregoing solution program in the present disclosure.

The communications interface 503 is configured to communicate with another device or a communications network such as an Ethernet, a radio access network (RAN), a core network, or a wireless local area network (WLAN).

The memory 502 may be a read-only memory (ROM), another type of static storage device that can store static information and instructions, a random-access memory (RAM), or another type of dynamic storage device that can store information and instructions, or may be an electrically erasable programmable ROM (EEPROM), a compact disc (CD) ROM (CD-ROM) or another optical disk storage, an optical disc storage (including a compact optical disc, a laser disc, an optical disc, a digital versatile disc (DVD), a BLU-RAY DISC, or the like), a magnetic disk storage medium or another magnetic storage device, or any other medium that can be configured to carry or store expected program code in a form of an instruction or a data structure and that can be accessed by a computer. This does not constitute a limitation herein. The memory may exist independently, and is connected to the processor using a bus. The memory may be integrated with the processor.

The memory 502 is configured to store and execute application program code of the foregoing solution, and the processor 501 controls execution. The processor 501 is configured to execute the application program code stored in the memory 502.

The code stored in the memory 502 may be used to execute the data processing method provided in FIG. 5, for example, receive a first data packet, where the first data packet includes first data, and a destination address of the first data is a first virtual machine, generate a second data packet, where the second data packet includes the first data and an identifier of a second virtual machine, the second virtual machine is the first virtual machine after being live migrated from the source physical machine to a destination physical machine, and the identifier of the second virtual machine is used to identify the second virtual machine on the destination physical machine, and send the second data packet to the destination physical machine.

The code stored in the memory 502 may be used to execute the data processing method provided in FIG. 5, for example, receive a second data packet sent by a source physical machine, where the second data packet is generated by the source physical machine according to a received first data packet, the first data packet includes first data, a destination address of the first data is a first virtual machine, the second data packet includes the first data and an identifier of a second virtual machine, the first virtual machine is the second virtual machine after being live migrated from the source physical machine to the destination physical machine, and the identifier of the second virtual machine is used to identify the second virtual machine on the destination physical machine, and determine, according to the identifier of the second virtual machine, that the first data is data to be sent to the second virtual machine.

It should be noted that, for a function of each functional unit of the physical machine 50 described in this embodiment of the present disclosure, reference may be made to related descriptions of the steps S501 to S509 in the method embodiment shown in FIG. 5. Details are not described herein again.

In the foregoing embodiments, descriptions of the embodiments have respective focuses. For a part that is not described in detail in an embodiment, refer to related descriptions in other embodiments.

During live migration of a virtual machine, it needs to be ensured that a network is not interrupted. A network is possibly interrupted if network traffic cannot correctly reach a destination or cannot be correctly received in the foregoing embodiment. In addition, another measurement indicator is entire duration of live migration of a virtual machine. To ensure that the network is not interrupted, a same network configuration as that of a source physical machine needs to be applied to a destination physical machine, and a virtual switch on a third-party physical machine needs to be instructed to update configuration information for communication with a virtual machine after migration after the virtual machine is migrated. In this way, network communication between the virtual machine and another virtual machine can be restored in a timely manner after the virtual machine is migrated.

In a public cloud scenario, there may be 100,000 or even a million of virtual machines. Therefore, if configuration information for communicating with the virtual machine after migration is not completely updated for a third-party virtual machine, traffic needs to be forwarded by a source physical machine. If the traffic is forwarded, a network is possibly interrupted (for example, even if the source physical machine is used as a jump-off point, an error or a packet loss may still occur during traffic forwarding). Therefore, longer entire duration of virtual machine live migration (including completion of network configuration and completion of virtual machine migration) indicates later time when the third virtual machine on a third-party physical machine starts to update the configuration information for communicating with the virtual machine after migration. When there are more third virtual machines, it takes longer time to complete updating the configuration information for communicating with the virtual machine after migration on the third virtual machine. In this case, the network is more likely to be interrupted. Therefore, this application further needs to ensure that entire duration of virtual machine migration is as short as possible, to reduce network interruption in the public cloud scenario or a large-scale virtual machine scenario as much as possible.

Figure 17:
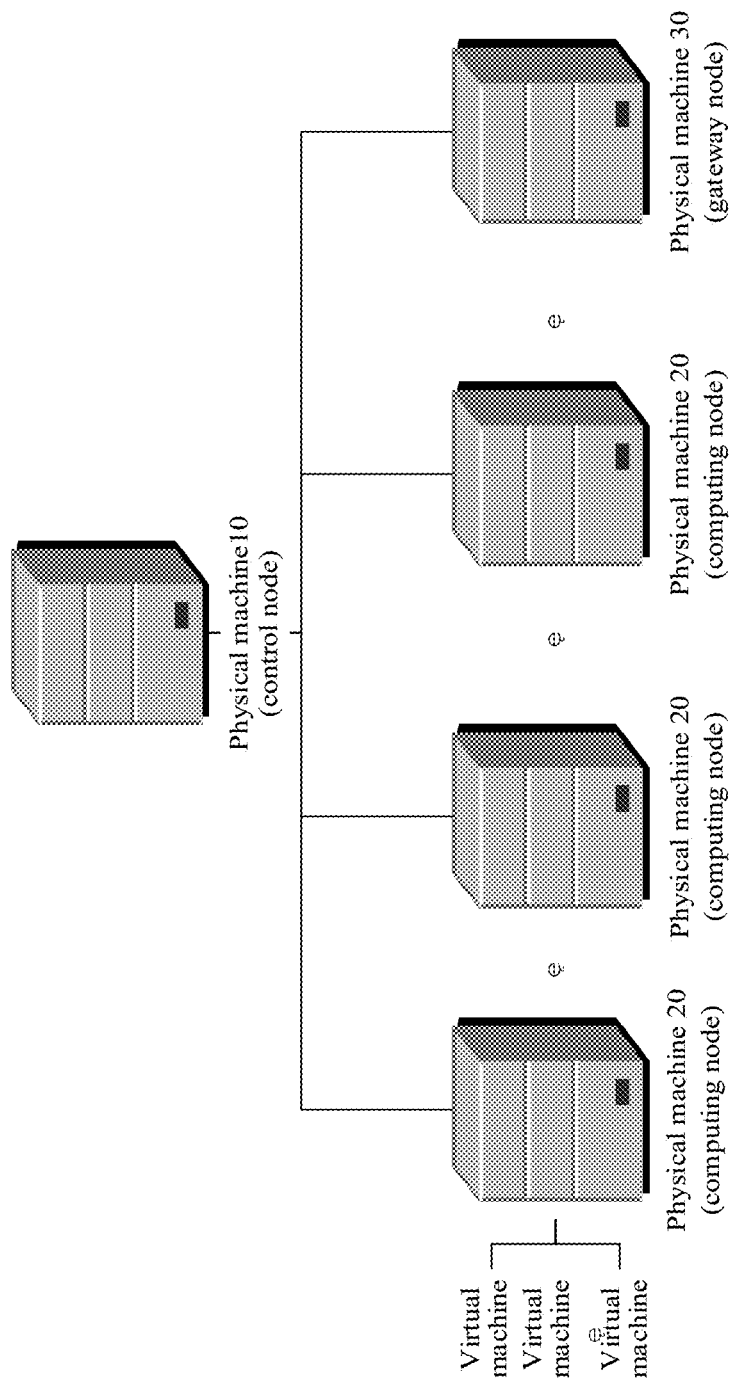
FIG. 17 is a schematic diagram of another architecture of a server according to an embodiment of the present disclosure.

Refer to FIG. 17. FIG. 17 is a schematic diagram of another architecture of a server according to an embodiment of the present disclosure. The server architecture includes at least one physical machine 10 used as a control node, a plurality of physical machines 20 used as computing nodes, and at least one physical machine 30 used as a gateway node. The physical machine 10 is configured to manage computing resources, network resources, and the like in the plurality of connected physical machines 20. A plurality of virtual machines may be deployed on the physical machine 20, and may be live migrated under management of the physical machine 10. The physical machine 30 serves as a gateway node to centralize gateway and switching information of all VPNs (VPC), and may be used as an intermediate node in cross-POD communication. Cross-POD communication refers to cross-domain communication. For example, two cloud servers of a customer run in equipment rooms in two cities, and mutual communication between the two cloud servers is cross-domain communication. It may be understood that the server architecture in FIG. 3 is merely an example implementation of this embodiment of the present disclosure, and a network in this embodiment of the present disclosure includes but is not limited to the server architecture.

Figure 18:
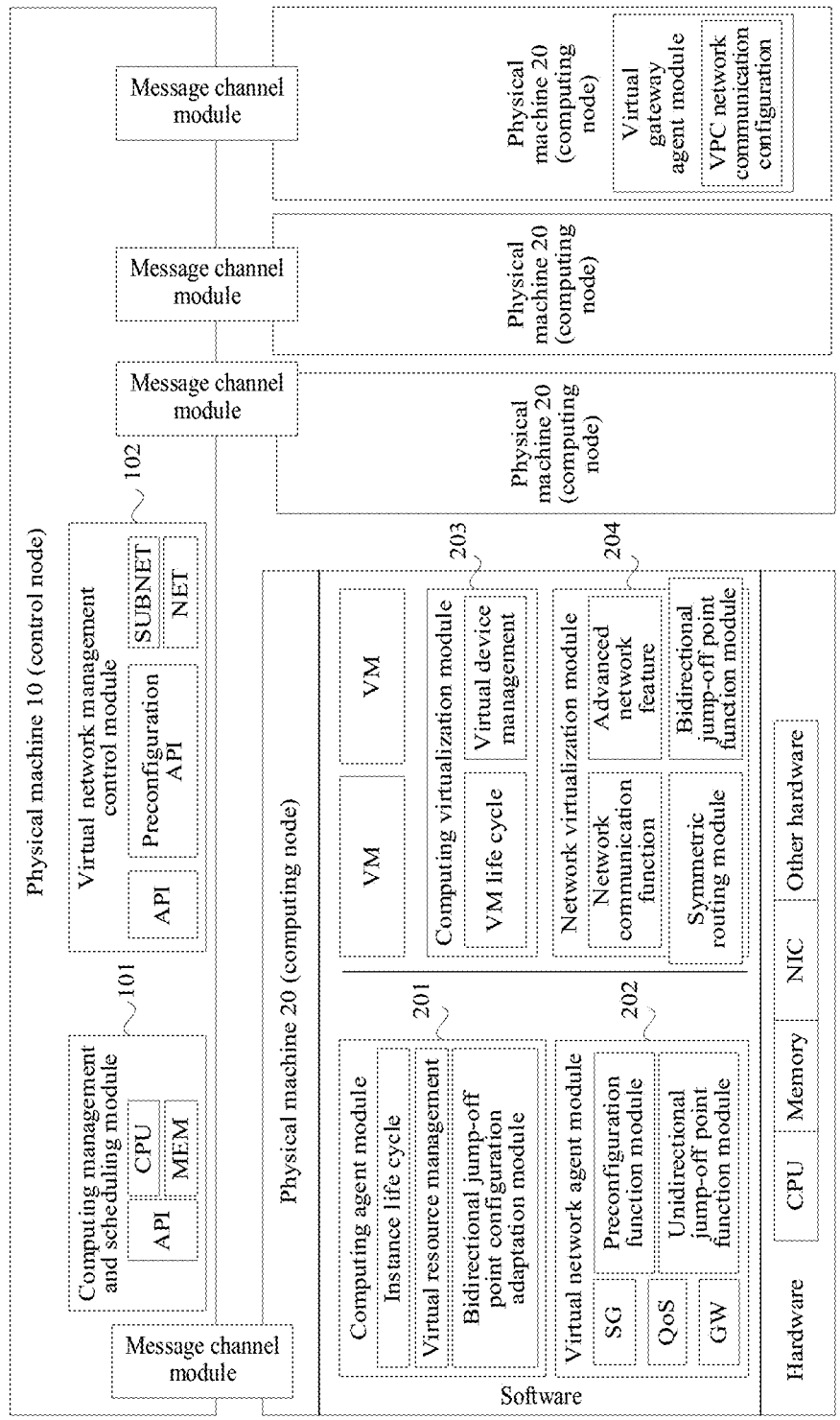
FIG. 18 is a schematic diagram of a structure of a control node physical machine, a computing node physical machine, and a gateway node physical machine according to an embodiment of the present disclosure.

Based on the foregoing server architecture, an embodiment of the present disclosure provides another physical machine 10, another physical machine 20, and another physical machine 30 applicable to the server architecture. Refer to FIG. 18. FIG. 18 is a schematic diagram of a structure of a control node physical machine, a computing node physical machine, and a gateway node physical machine according to an embodiment of the present disclosure. The physical machine 10 used as a control node may include a virtual computing management and scheduling module 101 and a virtual network management control module 102. The physical machine 20 used as a computing node may include a computing agent module 201, a virtual network agent module 202, a computing virtualization module 203, and a network virtualization module 204. For specific function descriptions of the modules, refer to the foregoing descriptions in FIG. 4. Compared with the schematic diagram of the structure in FIG. 4, optionally, the network virtualization module 204 may further include a symmetric routing module.

The symmetric routing module may be configured to distinguish whether uplink traffic is from a jump-off point or a third-party physical machine, to ensure that a return path is back to where the traffic starts. This can ensure symmetry and avoid network interruption caused by traffic asymmetry. For example, when a data packet is sent from a third-party physical machine, and is forwarded by a source physical machine to a destination physical machine, the destination physical machine may also send traffic to a third virtual machine using a symmetric path. To be specific, the traffic is sent from the destination physical machine, and is forwarded by the source physical machine to the third-party physical machine. When the data packet is sent from the third-party physical machine and directly reaches the destination physical machine, the destination physical machine directly sends a data packet to be sent to the third virtual machine to the third-party physical machine. In the embodiment corresponding to FIG. 5, a symmetric path may be used by the symmetric routing module to send the data packet from the destination physical machine to the third-party physical machine. Details are not described herein again.

It may be understood that the structure of the control node physical machine, the computing node physical machine, and the gateway node physical machine in FIG. 18 is merely an example implementation of this embodiment of the present disclosure. The structure of the control node physical machine, the computing node physical machine, and the gateway node physical machine in this embodiment of the present disclosure includes but is not limited to the foregoing structure.

Based on the server architecture shown in FIG. 17 and the structure of the control node physical machine and the computing node physical machine shown in FIG. 18, with reference to a data processing method provided in this application, the technical problem mentioned in this application is analyzed and resolved.

Figure 19:
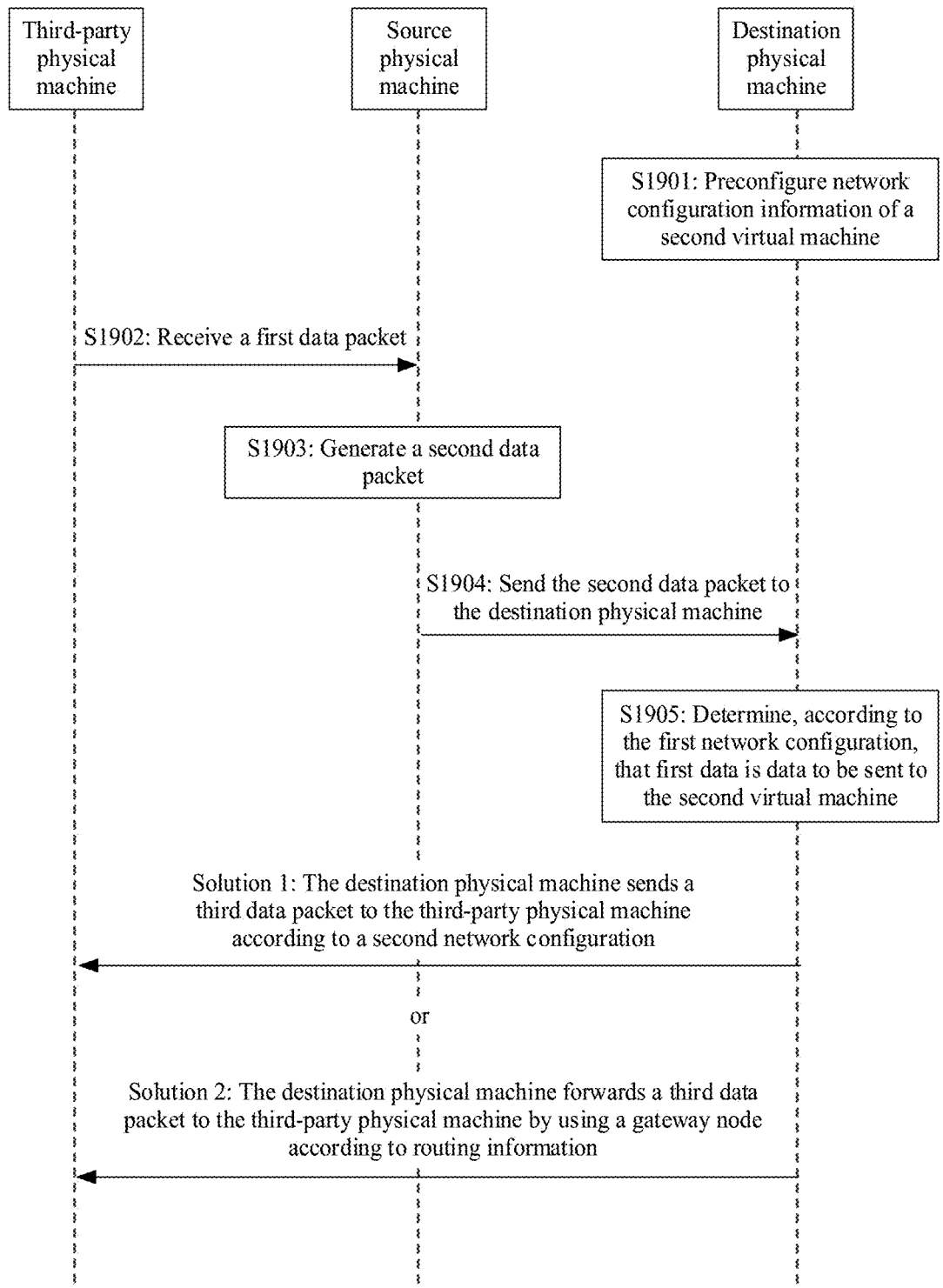
FIG. 19 is a schematic flowchart of another data processing method according to an embodiment of the present disclosure.

Refer to FIG. 19. FIG. 19 is a schematic flowchart of another data processing method according to an embodiment of the present disclosure. The method may be applied to the server architecture shown in FIG. 17. The physical machine 20 may be configured to support and perform steps S1901 to S1905 in a method procedure shown in FIG. 19. The following describes interaction between a source physical machine, a destination physical machine, and a third-party physical machine with reference to FIG. 19. The method may include the following steps S1902 to S1905, and optionally may further include the step S1901.

Step S1901: The destination physical machine preconfigures network configuration information of a second virtual machine before a first virtual machine is migrated to the destination physical machine, where the network configuration information includes a first network configuration for receiving data by the second virtual machine.

Step S1902: The source physical machine receives a first data packet, where the first data packet includes first data, and a destination address of the first data is the first virtual machine.

Step S1903: The source physical machine generates a second data packet, where the second data packet includes the first data, and the first virtual machine is the second virtual machine after being live migrated from the source physical machine to the destination physical machine.

Step S1904: The source physical machine sends the second data packet to the destination physical machine, and the destination physical machine receives the second data packet sent by the source physical machine, where the second data packet is generated by the source physical machine according to the received first data packet, the first data packet includes the first data, the destination address of the first data is the first virtual machine, and the first virtual machine is the second virtual machine after being live migrated from the source physical machine to the destination physical machine.

Step S1905: The destination physical machine determines, according to the first network configuration, that the first data is data to be sent to the second virtual machine.

In the foregoing steps S1901 to S1905, before the first virtual machine is migrated to the destination physical machine, a related preconfiguration of the second virtual machine is performed on the destination physical machine, that is, the preconfiguration is completed before the virtual machine is migrated. In this scenario, if related information about migration of the first virtual machine to the destination physical machine is not updated on some third-party physical machines, the data may continue to be sent to the source physical machine on which the first virtual machine is located. However, in this case, the virtual machine is actually migrated to the destination physical machine, and therefore the source physical machine still needs to be used as a transit to forward the received data to the destination physical machine. However, because the network configuration information of the second virtual machine has been preconfigured on the destination physical machine, and the network configuration information includes the first network configuration for receiving the data by the second virtual machine, the destination physical machine may directly identify, according to the first network configuration, that the first data in the second data packet is sent to the second virtual machine. Therefore, in this embodiment of the present disclosure, the second data packet may not need to carry an identifier of the second virtual machine, and the destination physical machine may also correctly identify that the first data is sent to the second virtual machine.

In a possible implementation, the first network configuration includes a network configuration of layer-2 communication, layer-3 communication, and EIP communication for receiving the data by the second virtual machine.

This embodiment of the present disclosure mainly optimizes a procedure of a computing agent and a network management layer, and adds a network configuration capability required by the virtual machine to a virtual machine migration procedure, to ensure that the virtual machine can be migrated to a network of the destination physical machine. This can avoid network interruption caused by a lack of network configuration on the destination physical machine. In this embodiment of the present disclosure, a preconfiguration is further classified into two types: general network preconfiguration and enhanced network preconfiguration.

Solution 1: General Network Configuration:

In a possible implementation, in addition to the first network configuration for receiving the data by the second virtual machine, the network configuration information of the second virtual machine may further include a second network configuration for sending data by the second virtual machine. The second network configuration includes a network configuration of layer-2 communication, layer-3 communication, and EIP communication for sending the data by the second virtual machine. That is, the second network configuration includes an address of a third-party physical machine on which a third virtual machine that has an interaction relationship with the second virtual machine is located. Therefore, the destination physical machine may send a third data packet to the third-party physical machine according to the second network configuration. The third data packet includes second data, a destination address of the second data is the third virtual machine, and the third virtual machine is a virtual machine that has an interaction relationship with the first virtual machine. That is, the destination physical machine may receive and parse, according to the preconfigured network configuration information, the data that is forwarded by the source physical machine and sent to the second virtual machine, or may directly send, according to the preconfigured network configuration information, data that needs to be sent or data in response to the first data to the corresponding third-party physical machine.

The general network preconfiguration is used to ensure that network interruption is not caused by an uncompleted network configuration on the destination physical machine after migration. This can reduce network interruption and can also greatly reduce live migration duration.

Solution 2: Enhanced Network Configuration:

In another possible implementation, in addition to the first network configuration for receiving the data by the second virtual machine, the network configuration information may further include routing information of a gateway node. When sending the data to the third-party physical machine, the destination physical machine may send the data packet to the gateway node according to the routing information, and forward the third data packet to the destination physical machine using the gateway node. The third data packet includes the second data, the destination address of the second data is the third virtual machine, and the third virtual machine is the virtual machine that has an interaction relationship with the first virtual machine. The gateway node stores the address of the third-party physical machine on which the third virtual machine that needs to interact with the second virtual machine on the destination physical machine is located. Therefore, before the first virtual machine is migrated, only the first network configuration for receiving the data may be preconfigured on the destination physical machine, and the second network configuration is temporarily not configured, because the second network configuration may include a relatively large amount of configuration information, and a relatively long period of configuration time is required. In this embodiment of the present disclosure, the second network configuration may be preconfigured and the virtual machine may be migrated at the same time. Before the second network configuration is completed, the second network configuration may be forwarded using the gateway node. The second network configuration continues to be configured on the destination physical machine at the same time. After the first network configuration and the second network configuration are completed on the destination physical machine, the destination physical machine directly feeds back the data to the third-party physical machine. This saves time for preconfiguring the second network configuration and improves duration and efficiency of entire migration.

It may be understood that, in the solution 2, after the second network configuration of the second virtual machine is completed on the destination physical machine, the third data packet may not be forwarded using a network node, but directly sent by the second virtual machine on the destination physical machine to the third-party physical machine according to the second network configuration.

As shown in FIG. 20, FIG. 20 is a schematic diagram of a packet encapsulation format before and after the third data packet is forwarded using the gateway node according to this embodiment of the present disclosure. When the third data packet is sent by the destination physical machine to the gateway node, a source address of an outer packet is the destination physical machine, a destination address of the outer packet is a gateway physical machine (that is, the gateway node), a source address of an inner packet is the second virtual machine, and a destination address of the inner packet is the third virtual machine. After the third data packet is sent to the gateway node, the source address of the outer packet of the third data packet is updated to the gateway physical machine, the destination address is updated to the third-party physical machine, the source address and the destination address of the inner packet remains unchanged, and data in the inner packet also remains unchanged. That is, the inner packet remains unchanged in either of a unidirectional jump-off point scenario, a bidirectional jump-off point scenario, a general network preconfiguration scenario, or an enhanced network preconfiguration scenario in this application. When a data packet is forwarded using a jump-off point or the gateway node, an address or related information is changed in an outer packet of the data packet.

It should be noted that, for layer-2 communication, layer-3 communication, and EIP communication, for example, when a VM1 and a VM2 belong to a same network segment, communication between them is layer-2 communication. If the VM1 and the VM2 are deployed on a same physical machine, data is forwarded using a MAC port. If the VM1 and the VM2 are deployed on different physical machines, tunnel encapsulation is required for layer 2 communication. Therefore, a flow table configuration is mainly required for layer 2 communication. For another example, if the VM1 and a VM3 belong to different network segments, communication between the VM1 and the VM3 is layer 3 communication. In this case, communication can be performed only using an intermediate route. Therefore, a route configuration is mainly required for layer 3 communication. For another example, if the VM1 needs to access www.HUAWEI.com, the VM1 needs to convert an internal IP address 192.168.1.101 to a public IP address, a public IP address of traffic returned by www.HUAWEI.com needs to be converted to an internal IP address of a corresponding HUAWEI virtual machine. This configuration is an EIP address configuration.

In a distributed hierarchical architecture of a public cloud or data center networking scenario, it cannot be ensured that a virtual machine network service is not affected in a virtual machine migration process because network interruption time of virtual machine live migration is affected by external factors. Virtual machine migration duration is affected by a VPC scale and cannot meet time requirements of large-scale virtual machine migration. As a POD scale expands and more services are provided, a plurality of cloud servers of a customer are distributed on different physical nodes. Therefore, a speed of updating third-party physical machine configurations directly affects network interruption time of virtual machine migration. In addition, a speed of restoring a network configuration of a destination host directly affects the network interruption time and live migration duration of virtual machine migration. This can further resolve problems that network interruption time of virtual machine live migration is long and entire live migration duration is long in an existing distributed hierarchical network architecture. Network interruption duration and predicted live migration duration can be determined in this application. Therefore, this can ensure that live migration is applicable to a large-scale scenario such as public cloud or a data center.

With reference to the structure of the physical machine 10 and the physical machine 20 provided in this embodiment of the present disclosure, and based on the foregoing method procedure executed by the physical machine 20, the following provides an implementation applicable to a live migration scenario to avoid network interruption. The implementation includes the following steps.

(1) Preconfigure a network configuration of a virtual machine on a destination physical machine during live migration.

Figure 21:
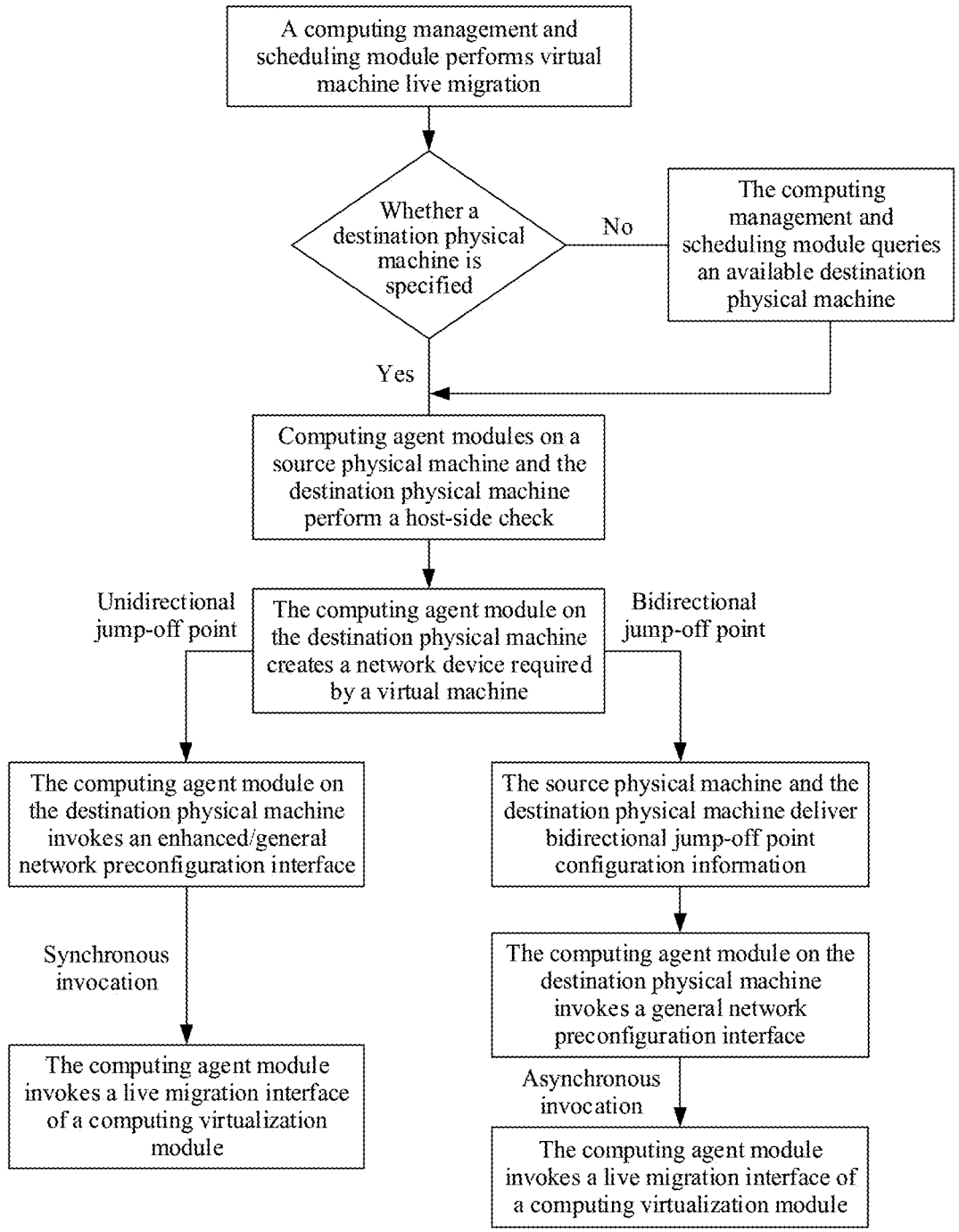
FIG. 21 is a schematic flowchart of another network preconfiguration according to an embodiment of the present disclosure.

As shown in FIG. 21, FIG. 21 is a schematic flowchart of another network preconfiguration according to this embodiment of the present disclosure. This step is performed in a live migration preparation phase of the computing management and scheduling module 101. The computing management and scheduling module 101 initiates a virtual machine live migration task.

First, the computing management and scheduling module 101 determines whether the destination physical machine is specified. If the destination physical machine is specified, the computing management and scheduling module 101 directly instructs, using an RPC message, the computing agent module 201 on a source physical machine to perform a live migration operation. If the destination physical machine is not specified, the computing management and scheduling module 101 selects an available destination physical machine, and instructs, using an RPC message, the computing agent module 201 on the source physical machine to perform a live migration operation.

Then, the computing agent module 201 on the source physical machine and that on the destination physical machine perform a host-side check. After the check succeeds, the computing virtualization module 203 on the destination physical machine creates a network device required by a virtual machine.

Finally, if a unidirectional jump-off point is used, the computing agent module 201 first invokes an enhanced network preconfiguration interface, and invokes a migration interface of the computing virtualization module 203 after the enhanced network preconfiguration interface returns a success. If a bidirectional jump-off point is used, the computing agent module 201 on the source physical machine and that on the destination physical machine need to first configure information for the jump-off point, and invoke the enhanced network preconfiguration interface and the migration interface of the computing virtualization module 203. Because the bidirectional jump-off point does not depend on a network preconfiguration of the destination physical machine, the two interfaces may be concurrently invoked.

(2) Enable a network jump-off point for live migration.

As shown in FIG. 9, FIG. 9 is a schematic flowchart of enabling a network jump-off point according to this embodiment of the present disclosure. This step is performed after the step (1) is completed and after the first virtual machine on the source physical machine is suspended in the live migration procedure of the computing virtualization module 203.

The computing virtualization module 203 first establishes a socket connection between the source physical machine and the destination physical machine during live migration.

Then, an initialized virtual machine on the destination physical machine is in a suspended state. The source physical machine copies a memory of the to-be-migrated virtual machine to the destination physical machine.

Before the last round of iterative memory copy, suspend the virtual machine and enable the network jump-off point for live migration. After the last round of iterative memory copy is completed, wake up the virtual machine on the destination physical machine.

(3) Forward the network jump-off point for live migration.

Figure 22A:
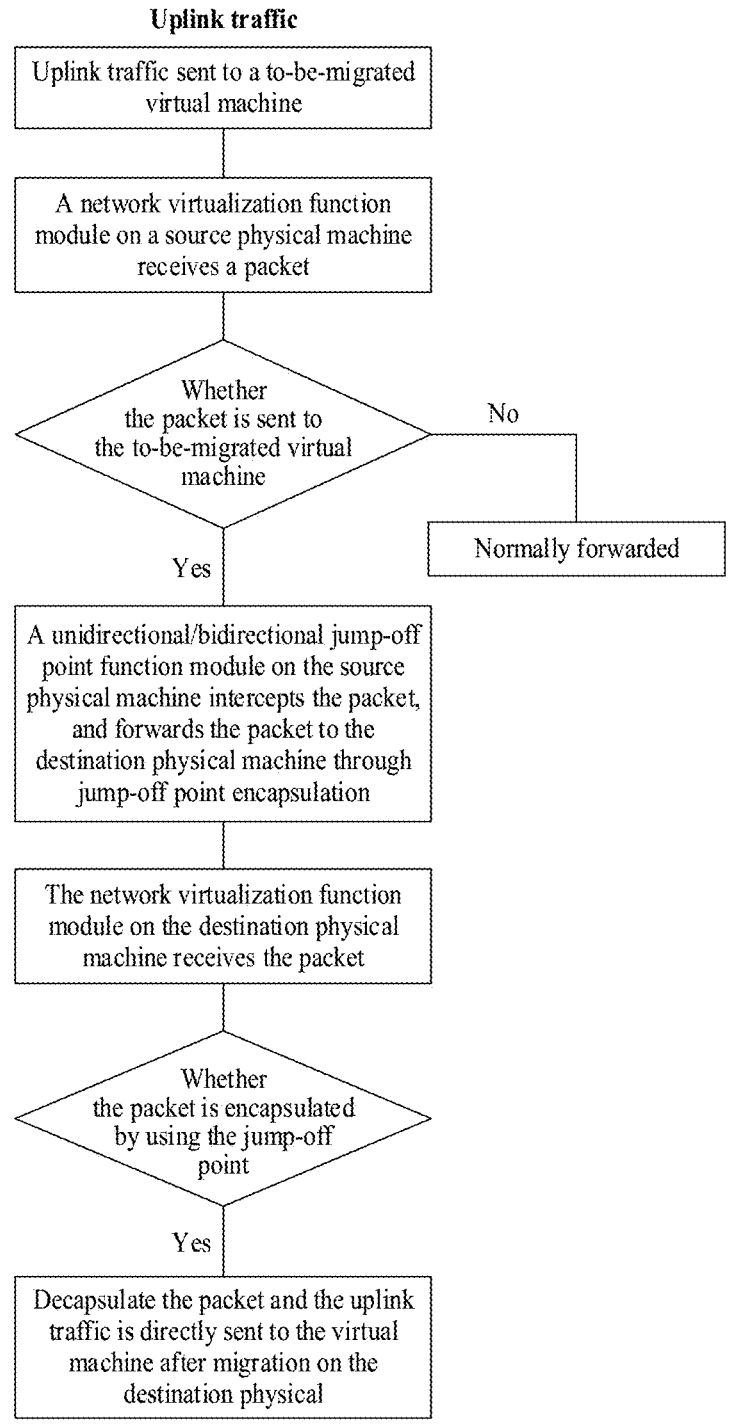
FIG. 22A and FIG. 22B are a schematic flowchart of another normal working procedure of a jump-off point according to an embodiment of the present disclosure.
Figure 22B:
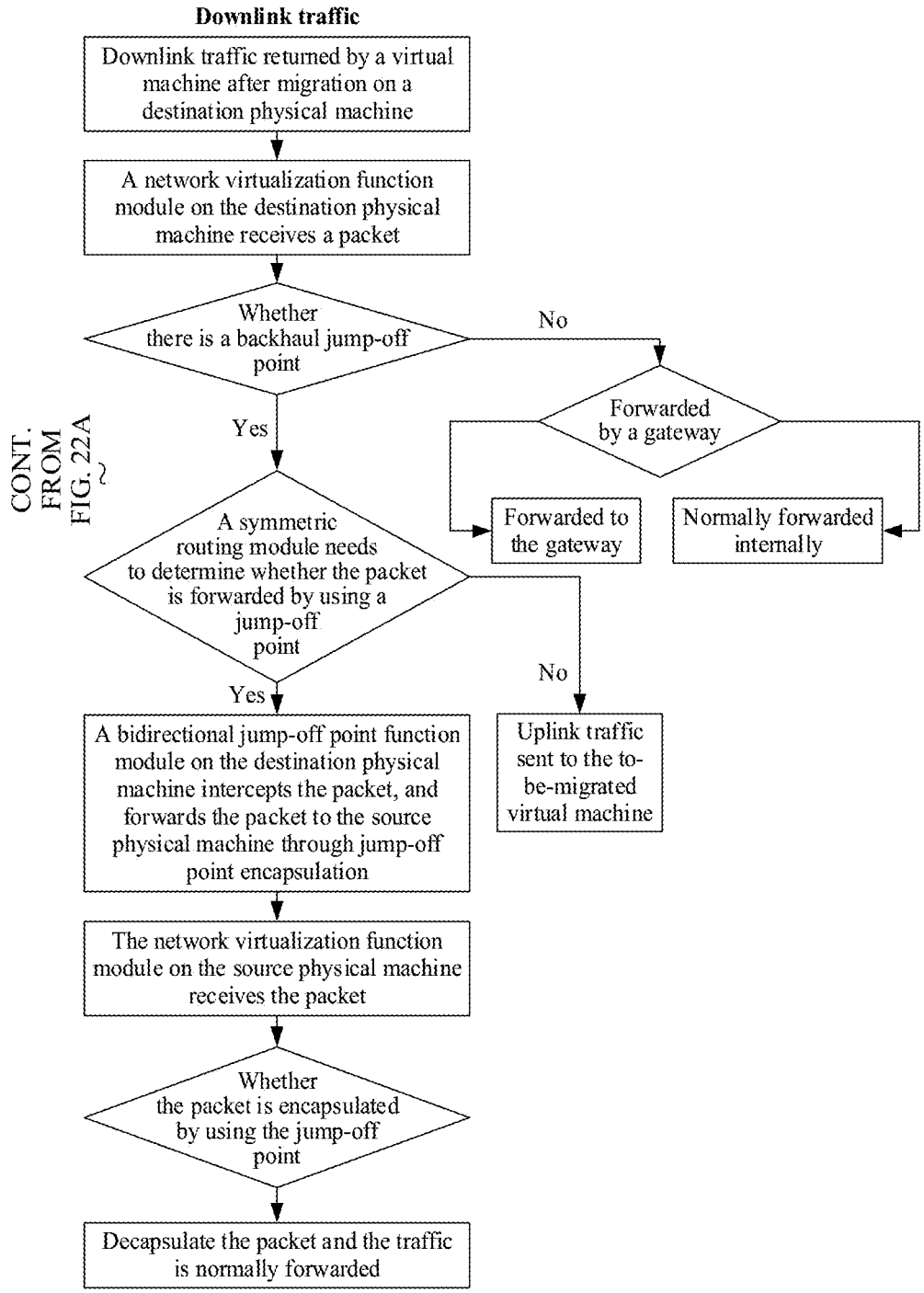

As shown in FIG. 22A and FIG. 22B, FIG. 22A and FIG. 22B are a schematic flowchart of another normal working procedure of a jump-off point according to this embodiment of the present disclosure. This step is automatically performed after the steps (1) and (2) are completed.

If uplink traffic (for example, the first data packet) needs to be guided to the source physical machine, the jump-off point function module in the network virtualization module 204 actively intercepts the traffic, and guides the traffic to the second virtual machine on the destination physical machine through jump-off point encapsulation.

If downlink traffic (for example, the third data packet) is responded by the second virtual machine, and there is a backhaul jump-off point, a symmetric routing module needs to first determine whether the data packet is forwarded using the jump-off point or normally forwarded. If the data packet is forwarded using the jump-off point, a backhaul jump-off point module encapsulates the original data packet and sends the data packet to the source physical machine, the source physical machine forwards the data packet to the third-party physical machine according to a normal rule (that is, there is a path for the bidirectional jump-off point). If there is no backhaul jump-off point, whether there is a gateway forwarding route needs to be determined. If there is a gateway forwarding route, backhaul traffic is first forwarded to a gateway and then to the third-party physical machine. If there is no gateway forwarding route, the backhaul traffic is forwarded by the destination physical machine to the third-party physical machine (that is, there is a path for the unidirectional jump-off point).

(4) Disable the network jump-off point for live migration.

As shown in FIG. 11, FIG. 11 is a schematic flowchart of disabling a jump-off point according to this embodiment of the present disclosure. This step is performed after the steps (1) and (2) are completed.

The computing virtualization module on the source physical machine periodically checks whether the jump-off point is not used before a timeout. If a timeout occurs, the computing virtualization module deletes the network jump-off point for live migration on the source physical machine and instructs the destination physical machine to delete a reverse network jump-off point for live migration. If a timeout does not occur, the computing virtualization module continues to perform a next cycle. Perform this step only when the source physical machine does not have the uplink traffic of the to-be-migrated virtual machine or the jump-off point timeout occurs.

Figure 23:
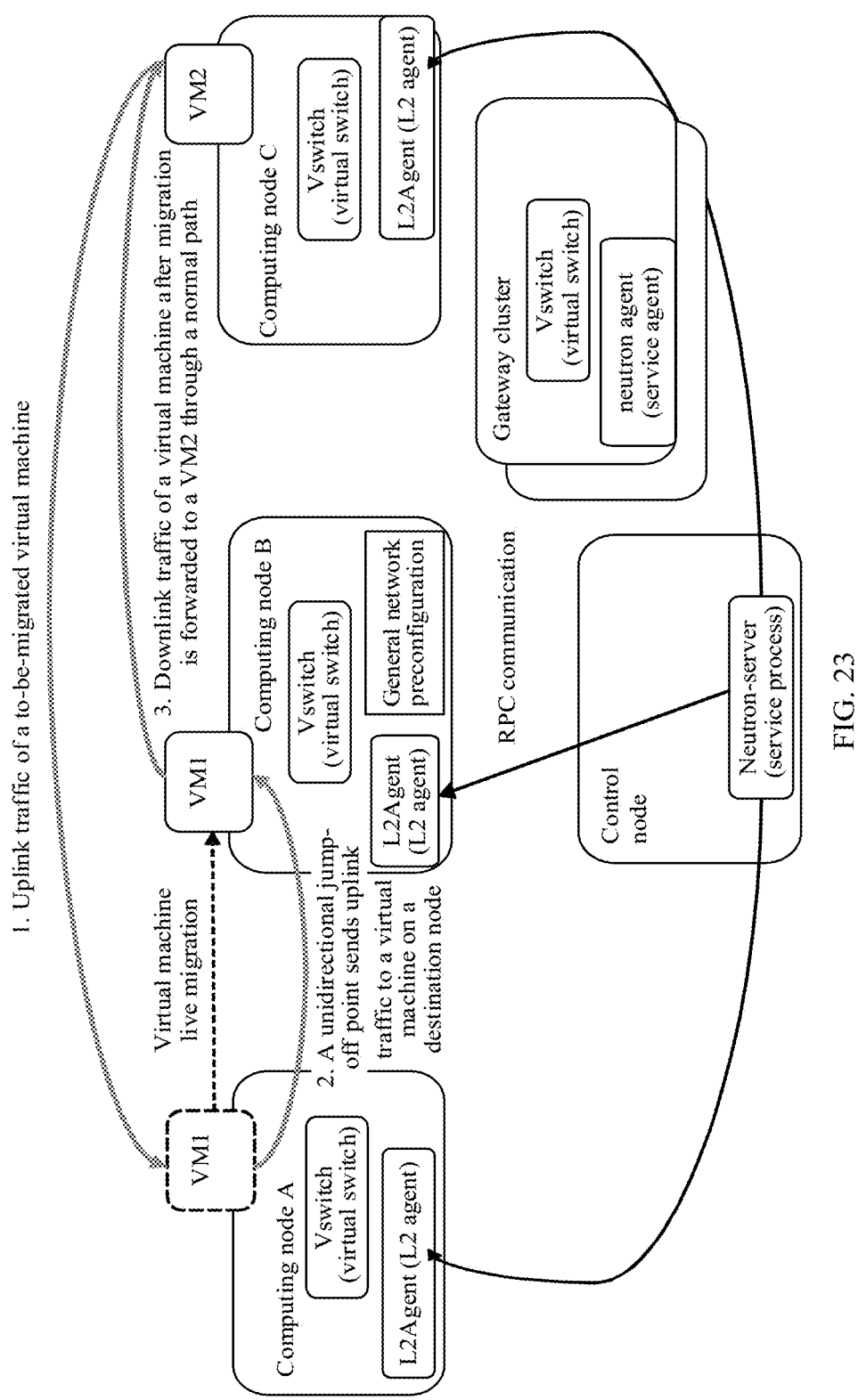
FIG. 23 is a schematic diagram of a bidirectional jump-off point and a symmetric routing data model according to an embodiment of the present disclosure.
Figure 24:
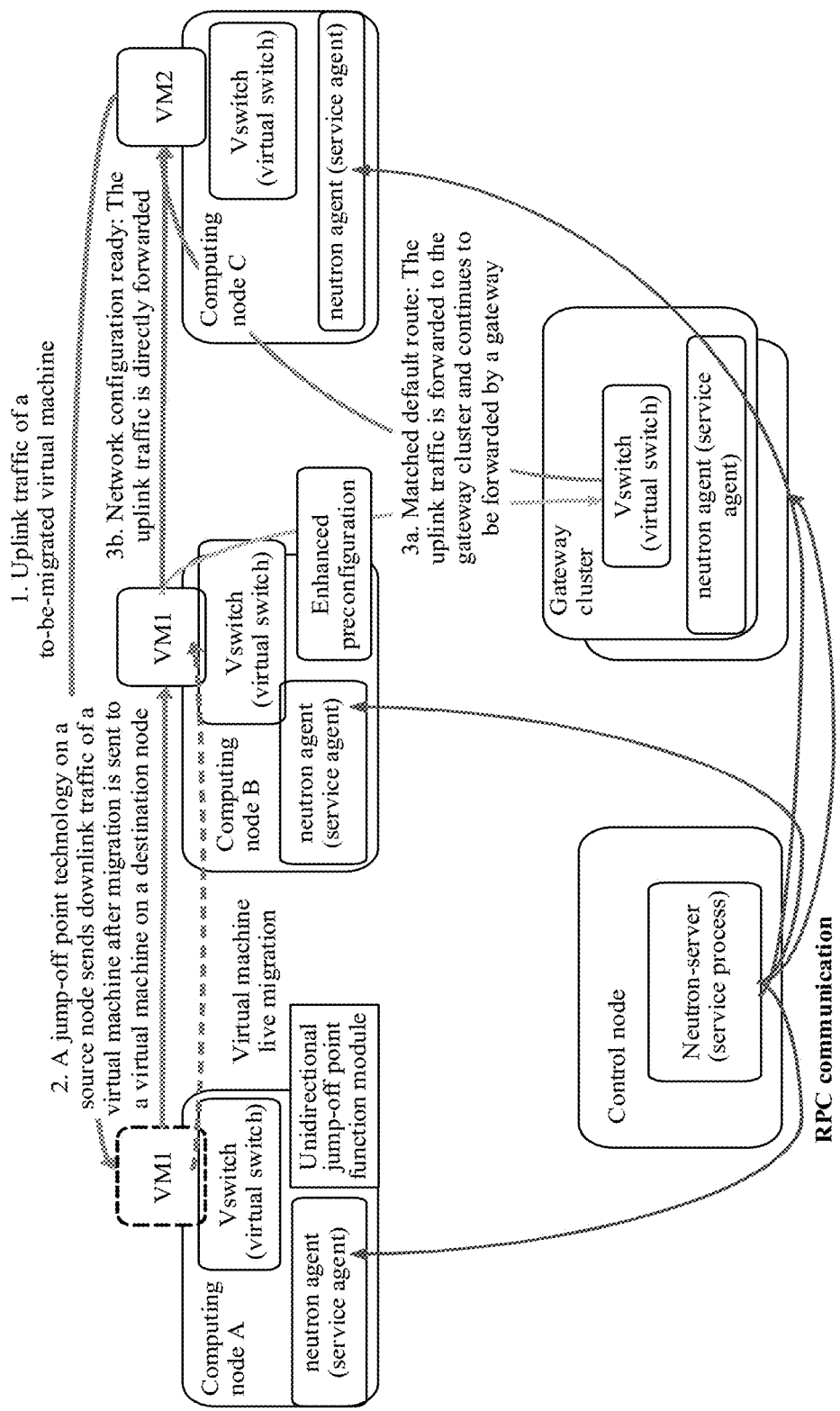
FIG. 24 is a schematic diagram of a unidirectional jump-off point and a general network preconfiguration data model according to an embodiment of the present disclosure.
Figure 25:
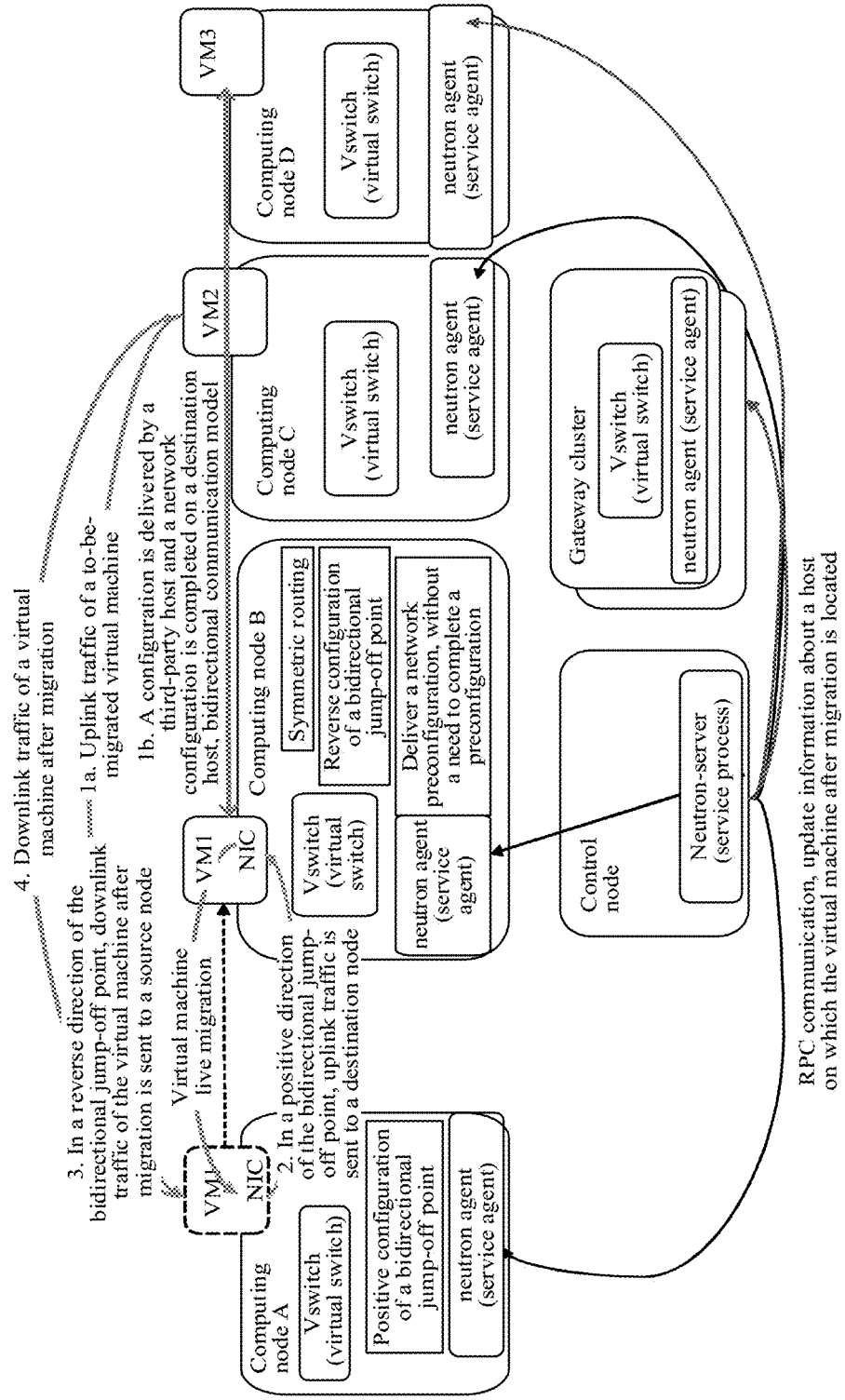
FIG. 25 is a schematic diagram of a unidirectional jump-off point and an enhanced network preconfiguration data model according to an embodiment of the present disclosure.

With reference to the schematic diagrams of the unidirectional jump-off point data model and the bidirectional jump-off point data model shown in FIG. 12 and FIG. 13, and the corresponding description, FIG. 23 is a schematic diagram of a bidirectional jump-off point and a symmetric routing data model according to an embodiment of the present disclosure, FIG. 24 is a schematic diagram of a unidirectional jump-off point and a general network preconfiguration data model according to an embodiment of the present disclosure, FIG. 25 is a schematic diagram of a unidirectional jump-off point and an enhanced network preconfiguration data model according to an embodiment of the present disclosure. For the schematic diagram of the data model, refer to the description of the foregoing embodiments. Details are not described herein again.

The foregoing describes in detail the method in the embodiments of the present disclosure, and the following provides a related apparatus in embodiments of the present disclosure.

Figure 26:
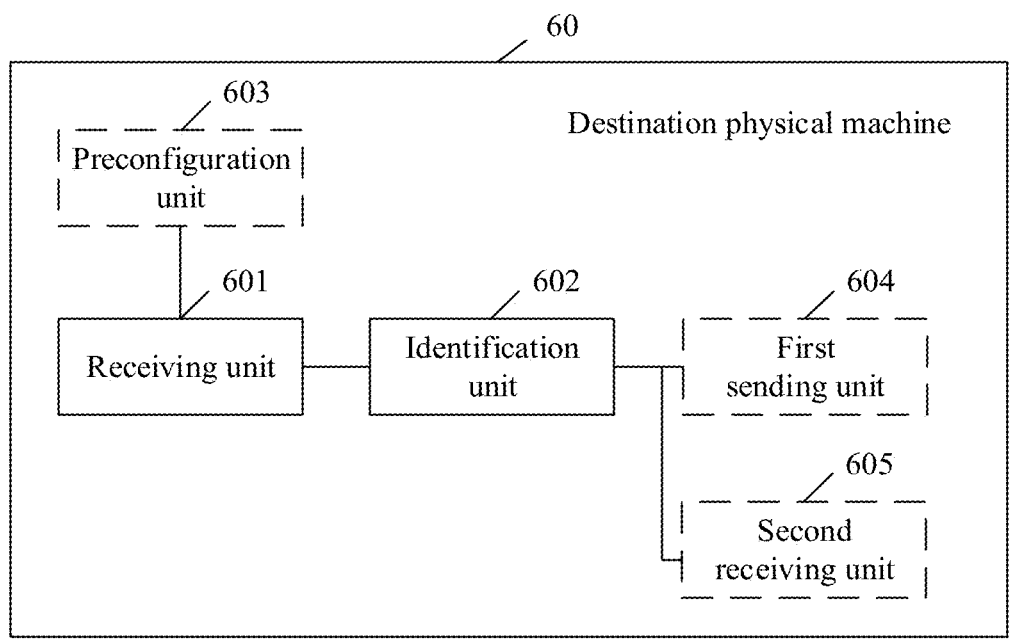
FIG. 26 is a schematic diagram of a structure of a physical machine according to an embodiment of the present disclosure.

Refer to FIG. 26. FIG. 26 is a schematic diagram of a structure of a physical machine according to an embodiment of the present disclosure. The physical machine is a destination physical machine. The destination physical machine 60 may include a first receiving unit 601, a first processing unit 602, and a first sending unit 603. The units are described in detail as follows.

The receiving unit 601 is configured to receive a second data packet sent by a source physical machine, where the second data packet is generated by the source physical machine according to a received first data packet, the first data packet includes first data, a destination address of the first data is a first virtual machine, the first virtual machine is a second virtual machine after being live migrated from the source physical machine to the destination physical machine, network configuration information of the second virtual machine has been preconfigured on the destination physical machine, and the network configuration information includes a first network configuration for receiving data by the second virtual machine.

The identification unit 602 is configured to determine, according to the first network configuration, that the first data is data to be sent to the second virtual machine.

In a possible implementation, the physical machine 60 further includes a preconfiguration unit 603 configured to preconfigure the network configuration information of the second virtual machine before the first virtual machine is migrated to the destination physical machine.

In a possible implementation, the first network configuration includes a network configuration of layer-2 communication, layer-3 communication, and EIP communication for receiving the data by the second virtual machine.

In a possible implementation, the network configuration information further includes a second network configuration for sending data by the second virtual machine, and the second network configuration includes a network configuration of layer-2 communication, layer-3 communication, and EIP communication for sending the data by the second virtual machine, and the physical machine 60 further includes a first sending unit 604 configured to send, according to the second network configuration, a third data packet to a third-party physical machine, where the third data packet includes second data, a destination address of the second data is a third virtual machine, and the third virtual machine is a virtual machine that has an interaction relationship with the first virtual machine.

In a possible implementation, the network configuration information further includes routing information of a gateway node, the gateway node stores an address of a third-party physical machine on which the third virtual machine is located, and the third virtual machine is the virtual machine that has an interaction relationship with the first virtual machine, and the physical machine 60 further includes a second sending unit 605 configured to forward, according to the routing information, a third data packet to the third-party physical machine using the gateway node, where the third data packet includes second data, and a destination address of the second data is the third virtual machine. It should be noted that, for a function of each functional unit of the destination physical machine 60 described in this embodiment of the present disclosure, refer to related descriptions of the steps S1901 to S1902 in the method embodiment shown in FIG. 19. Details are not described herein again. It may be understood that, for a structure of the destination physical machine in this embodiment of the present disclosure, refer to the schematic diagram of the structure of the physical machine shown in FIG. 16. Details are not described herein again.

It should be noted that, for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all belong to embodiments, and the actions and modules are not necessarily required by this application.

In the several embodiments provided in this application, it should be understood that the disclosed apparatus may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of this application essentially, or the part contributing to the other approaches, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a magnetic disk, an optical disc, a ROM, or a RAM.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method implemented by a source physical machine, wherein the method comprises:
   receiving a first data packet comprising first data, wherein a first destination address of the first data is of a first virtual machine;
   generating a second data packet comprising the first data and a first identifier identifying a second virtual machine, wherein the second virtual machine is the first virtual machine after being live migrated from the source physical machine to a destination physical machine;
   sending the second data packet to the destination physical machine;
   receiving a third data packet from the destination physical machine, wherein the third data packet comprises second data and a second identifier identifying the first virtual machine, and wherein a second destination address of the second data is of a third virtual machine;
   determining, according to the second identifier, a first address of a third-party physical machine on which the third virtual machine is located;
   generating a fourth data packet according to the first address, wherein the fourth data packet comprises the second data; and
   sending the fourth data packet to the third-party physical machine.

2. The method of claim 1, wherein the method further comprises:
   obtaining, according to the second identifier, configuration information of the first virtual machine, wherein the configuration information comprises the first address; and
   searching for and determining, according to the configuration information, the first address.

3. The method of claim 2, wherein the configuration information further comprises a central processing unit (CPU) configuration, a graphics card configuration, a network configuration, or a storage configuration.

4. The method of claim 2, wherein migration information of the first virtual machine is not updated on the third virtual machine, and wherein the migration information comprises a second address of the destination physical machine.

5. The method of claim 2, further comprising deleting the configuration information when the source physical machine does not receive the first data packet within a preset time period.

6. The method of claim 2, further comprising deleting the configuration information after migrating the first virtual machine from the source physical machine to the destination physical machine.

7. The method of claim 1, wherein the first identifier comprises a virtual network interface card identifier of the second virtual machine.

8. A physical machine comprising:
   a memory configured to store instructions; and
   a processor coupled to the memory, wherein the instructions cause the processor to be configured to:
     receive a first data packet comprising first data, wherein a first destination address of the first data is of a first virtual machine;
     generate a second data packet comprising the first data and a first identifier identifying a second virtual machine, wherein the second virtual machine is the first virtual machine after being live migrated from the physical machine to a destination physical machine;
     send the second data packet to the destination physical machine;
     receive a third data packet from the destination physical machine, wherein the third data packet comprises second data and a second identifier identifying the first virtual machine, and wherein a second destination address of the second data is of a third virtual machine;
     determine, according to the second identifier, a first address of a third-party physical machine on which the third virtual machine is located;
     generate a fourth data packet according to the first address, wherein the fourth data packet comprises the second data; and
     send the fourth data packet to the third-party physical machine.

9. The physical machine of claim 8, wherein the instructions further cause the processor to be configured to:
   obtain, according to the second identifier, configuration information of the first virtual machine, wherein the configuration information comprises the first address; and
   search for and determine, according to the configuration information, the first address.

10. The physical machine of claim 9, wherein the configuration information further comprises a central processing unit (CPU) configuration, a graphics card configuration, a network configuration, or a storage configuration.

11. The physical machine of claim 9, wherein migration information of the first virtual machine is not updated on the third virtual machine, and wherein the migration information comprises a second address of the destination physical machine.

12. The physical machine of claim 9, wherein the instructions further cause the processor to be configured to delete the configuration information when the physical machine does not receive the first data packet within a preset time period.

13. The physical machine of claim 9, wherein the instructions further cause the processor to be configured to delete the configuration information after migrating the first virtual machine from the physical machine to the destination physical machine.

14. The physical machine of claim 8, wherein the first identifier comprises a virtual network interface card identifier of the second virtual machine.

15. A computer program product comprising computer-executable instructions stored on a non-transitory computer-readable medium that, when executed by a processor, cause a physical machine to:
   receive a first data packet comprising first data, wherein a first destination address of the first data is of a first virtual machine;
   generate a second data packet comprising the first data and a first identifier identifying a second virtual machine, wherein the second virtual machine is the first virtual machine after being live migrated from the physical machine to a destination physical machine;
   send the second data packet to the destination physical machine;
   receive a third data packet from the destination physical machine, wherein the third data packet comprises second data and a second identifier identifying the first virtual machine, and wherein a second destination address of the second data is of a third virtual machine;

determine, according to the second identifier, a first address of a third-party physical machine on which the third virtual machine is located;

generate a fourth data packet according to the first address, wherein the fourth data packet comprises the second data; and send the fourth data packet to the third-party physical machine.

16. The computer program product of claim 15, wherein the computer-executable instructions further cause the physical machine to:

obtain, according to the second identifier, configuration information of the first virtual machine, wherein the configuration information comprises the first address; and search for and determine, according to the configuration information, the first address.

17. The computer program product of claim 16, wherein the configuration information further comprises a central processing unit (CPU) configuration, a graphics card configuration, a network configuration, or a storage configuration.

18. The computer program product of claim 16, wherein migration information of the first virtual machine is not updated on the third virtual machine, and wherein the migration information comprises a second address of the destination physical machine.

19. The computer program product of claim 16, wherein the computer-executable instructions further cause the physical machine to delete the configuration information when the physical machine does not receive the first data packet within a preset time period.

20. The computer program product of claim 15, wherein the first identifier comprises a virtual network interface card identifier of the second virtual machine.

* * * * *